United States Patent [19]

Vinciarelli

[11] Patent Number: 5,289,361
[45] Date of Patent: Feb. 22, 1994

[54] ADAPTIVE BOOST SWITCHING PREREGULATOR AND METHOD

[75] Inventor: Patrizio Vinciarelli, Boston, Mass.

[73] Assignee: VLT Corporation, San Antonio, Tex.

[21] Appl. No.: 642,232

[22] Filed: Jan. 16, 1991

[51] Int. Cl.$^5$ .................................. H02M 3/156
[52] U.S. Cl. ................................ 363/80; 323/222; 323/299; 363/81; 363/89
[58] Field of Search ............. 323/222, 266, 281, 284, 323/299, 301; 363/80, 81, 89, 143; H02M 3/155, 3/156; G05F 5/00, 5/04

[56] References Cited

U.S. PATENT DOCUMENTS

| | | | |
|---|---|---|---|
| 3,571,697 | 3/1971 | Phillips | 323/222 |
| 3,696,286 | 10/1972 | Ule | 320/40 |
| 3,899,731 | 8/1975 | Smith | 322/25 |
| 4,084,103 | 4/1978 | Burns et al. | 307/132 R |
| 4,304,171 | 12/1981 | Lang et al. | 91/3 |
| 4,355,240 | 10/1982 | Hamilton | 307/44 |
| 4,384,321 | 5/1983 | Rippel | 363/124 |
| 4,412,277 | 10/1983 | Mitchell | 363/81 |
| 4,415,963 | 11/1983 | Rippel et al. | 363/135 |
| 4,437,146 | 3/1984 | Carpenter | 363/21 |
| 4,445,420 | 5/1984 | Lang et al. | 91/3 |
| 4,467,268 | 8/1984 | Chambers et al. | 323/222 |
| 4,642,745 | 2/1987 | Steigeswald et al. | 363/37 |
| 4,677,366 | 6/1987 | Wilkenson et al. | 323/222 |
| 4,683,529 | 7/1987 | Bucher | 363/44 |
| 4,743,812 | 5/1988 | Dishner | 318/14 |
| 4,774,624 | 9/1988 | Qualich | 361/159 |
| 4,792,887 | 12/1988 | Bernitz et al. | 363/89 |
| 4,801,859 | 1/1989 | Dishner | 323/224 |
| 4,814,685 | 3/1989 | Renger | 323/224 |
| 4,821,163 | 4/1989 | Bloom | 363/49 |
| 4,837,495 | 6/1989 | Zansky | 323/222 |
| 4,853,668 | 8/1989 | Bloom | 336/214 |
| 4,864,478 | 9/1989 | Bloom | 363/16 |
| 4,864,482 | 9/1989 | Quazi et al. | 363/37 |
| 4,940,929 | 7/1990 | Williams | 323/222 |
| 4,941,079 | 7/1990 | Ooi | 363/132 |
| 5,084,666 | 1/1992 | Bolash | 323/267 |

FOREIGN PATENT DOCUMENTS

| | | | |
|---|---|---|---|
| 0383382 | 8/1990 | European Pat. Off. | |
| 31546 | 3/1979 | Japan | 323/266 |
| 9711 | 1/1986 | Japan | 323/222 |
| 84056 | 3/1990 | Japan | |

Primary Examiner—William H. Beha, Jr.
Attorney, Agent, or Firm—Fish & Richardson

[57] ABSTRACT

The performance of AC to DC and DC to DC boost preregulators, and the performance of the equipment of which they form a part, can be improved by means of an adaptive boost switching preregulator which can, when used with a load capable of operating over a range of load voltages, increase or optimize the conversion efficiency and reliability of both the preregulator and the load by adaptively controlling the load voltage as a function of the voltage of the input source. Also, a gain-variable current controller can be provided which allows for accurately controlling the waveform and magnitude of the input current of a switching preregulator as the preregulator load (and hence the input current) varies over a wide dynamic range, yet does so by comparing signals whose magnitudes are essentially independent of the magnitude of the load. In this way, second order effects, which cause degradation in control of power factor in other preregulators as load is decreased, are rendered less significant.

29 Claims, 10 Drawing Sheets

ADAPTIVE BOOST SWITCHING PREREGULATOR AND METHOD

BACKGROUND OF THE INVENTION

This invention relates to boost switching power conversion and to input current control.

The proliferation of AC line-operated electronic equipment in the office, factory and home (e.g. personal computers, workstations, FAX machines, controllers) has caused equipment designers, equipment end-users and utility companies to pay increasing attention to the interface between the equipment and the AC utility lines. Conventionally, most line-operated electronic equipment has incorporated a simple capacitive-input rectifier circuit for processing the AC line voltage into a raw source of DC voltage from which system loads draw their power (in many cases, the system loads are postregulators, such as DC-DC converters, which process the relatively high voltage rectifier output into the lower voltages appropriate for powering equipment circuitry). There are a number of disadvantages associated with using capacitive-input rectifiers. Capacitive-input rectifiers draw relatively high peak currents for a relatively short time period at the peak of each half-cycle of the AC line. The high harmonic content of this current waveform results in an rms current which is much higher than it would otherwise be if the waveform of the current followed the essentially sinusoidal waveform of the utility line. Typical capacitive-input rectifiers exhibit a power factor (e.g. the ratio of the average power delivered to the equipment by the rectifier to the product of the rms values of the AC-line voltage and line current) in the range of 0.5 to 0.65. To the designer of electronic equipment, power factor translates directly into how much packaged electronic circuitry can be powered off of a standard utility outlet. If equipment with unity power factor is plugged into a standard outlet rated to deliver 1200 Watts, then the equipment can utilize the full rating the outlet. If however, the equipment has a power factor of 0.5, only 600 Watts of real power can be utilized, the rest being lost at the utility interface in the form of circulating harmonic currents.

One prior art method of achieving essentially unity power factor at the utility line interface involves interposing a boost switching power converter (i.e. a switching power converter which delivers power to a load at a voltage level greater than the voltage level of its input source) between the output of a line rectifier and the system loads. A unity power factor controller maintains the boost converter output voltage at an essentially constant level, above the maximum anticipated peak value of sinusoidal line voltage, while simultaneously forcing the waveform of the current drawn from the AC line to follow the line voltage waveform. When compared to conventional capacitive-input rectifier schemes of equivalent power, unity power factor preregulators allow for a substantial reduction in the size of storage capacitors, significantly reduce the peak and rms currents drawn from the AC line, and provide for essentially full utilization of the power rating of standard AC power outlets. Examples of AC to DC converters of this type are described in Wilkerson, U.S. Pat. No. 4,677,366 and Williams, U.S. Pat. No. 4,940,929.

Also, in prior art unity power factor preregulators the magnitude of the converter input current is sensed by an element having a fixed transfer characteristic (e.g. a resistor or a current transformer), and this current sense signal is used by control circuitry to force the input current to follow the line voltage waveform. As converter load is decreased, both the converter input current and the magnitude of the signal delivered by the current sensing element decrease. As a result, as load is decreased, second order effects (e.g. amplifier offset voltages, system switching noise) become increasingly significant relative to the magnitude of the current sense signal and power factor control performance is degraded.

SUMMARY OF THE INVENTION

In various aspects, the invention improves the performance of AC to DC and DC to DC boost preregulators and the equipment of which they form a part. In one aspect, an adaptive boost switching preregulator can, when used with a load capable of operating over a range of load voltages, increase or optimize the conversion efficiency and reliability of both the preregulators and the load by adaptively controlling the load voltage as a function of the voltage of the input source. In another aspect, a gain variable current controller accurately controls the waveform and magnitude of the input current of an AC to DC switching preregulator as the preregulator load (and hence the input current) varies over a wide dynamic range, yet which does so by comparing signals whose magnitudes are essentially independent of the magnitude of the load. In this way, the second order effects, which cause degradation in control of power factor in other kinds of preregulators as load is decreased, are rendered less significant.

Thus, in general, in one aspect, the invention features controlling a boost switching preregulator of the kind which converts power from a source of unipolar input voltage for delivery as a unipolar output voltage to a load, input voltage decreases below the second input voltage value, Vi2, but does not become less than the first input voltage value, Vi1. In one example, Vi1 is essentially 200 Volts, Vi2 is essentially 230 Volts, Vo1 is essentially 250 Volts, and Vo2 is essentially 385 Volts.

In some embodiments, the unipolar output voltage, Vo, is set in accordance with the following predefined relationship: (a) Vo = Vo1 if the unipolar input voltage, Vin, is less than Vin1; (b) Vo = Vo2 if Vin is greater than Vin2 and less than or equal to Vo2; (c) For values of Vin between Vin1 and Vin2, Vo varies linearly between the values Vo1 and Vo2; where Vin is the value of the unipolar input voltage; Vo2 is greater than both Vo1 and Vin2; Vo1 is greater than Vin1; and Vin2 is greater than Vin1. In one example, Vo1 is essentially 300 Volts, Vo2 is essentially 390 Volts, Vin1 is essentially 270 V and Vin2 is essentially 380 V.

The controller may include an adaptive reference source, the adaptive reference source accepting an input signal indicative of the magnitude (or peak value) of the unipolar input voltage, the adaptive reference source delivering a reference signal, Vra, indicative of the value at which the controller is to maintain the (average) unipolar output voltage, the adaptive reference source varying the magnitude of the reference signal, Vra, as a means of adjusting the value (or average value) of the unipolar output voltage over the predefined range.

In another aspect, the invention features the controller itself.

In general, in another aspect, the invention features controlling the input current drawn by a switching power converter notwithstanding wide variations in a load being supplied by the converter, the control being done in by varying the value of the unipolar output voltage in response to the magnitude of the unipolar input voltage and within a range such that (a) the unipolar output voltage is greater than or equal to the magnitude of the unipolar input voltage, and (b) the span of the range is at least ten percent of the maximum value of the range.

Preferred embodiments include the following features. In some embodiments the unipolar input voltage is an essentially DC voltage at level Vin, and the unipolar output voltage is an essentially DC voltage at level Vo. In some embodiments, the unipolar input voltage is a time-varying unipolar voltage derived from an AC source and having a peak value Vp, and the value of the unipolar output voltage Vo is varied within the range such that the Vo is greater than or equal to Vp. The range falls within a predetermined spread of operating load voltages associated with the load. The unipolar output voltage is caused to increase (decrease) as the unipolar input voltage increases (decreases).

In some embodiments, the unipolar output voltage is varied between two values: a first load voltage value, Vol, and a second load voltage value, Vo2, the first load voltage value being less than the second load voltage value. The unipolar output voltage (a) is set equal to the second load voltage value, Vo2, if the unipolar input voltage is above a second input voltage value Vi2, Vi2 being less than Vol, and (b) is set equal to the first load voltage, Vol, if the unipolar input voltage is below a first input voltage value, Vil, Vil being less than both Vi2 and Vol. The unipolar output voltage (a) is maintained at the first load voltage value, Vol, if the unipolar input voltage increases above the first input voltage value, Vil, but does not exceed the second input voltage value, Vi2, and (b) is maintained at the second load voltage value, Vo2, if the response to the magnitude of a first signal. An input current control signal is generated based on comparing a second signal to a third signal, the second signal being independent of variations in the input current or the first signal, the third signal being dependent on variations in the input current and the first signal. The input current control signal drives the value of the third signal toward the value of a second signal, the third signal being maintained at a magnitude essentially equal to the magnitude of the second signal.

Preferred embodiments of the invention include the following features. The second signal is a reference signal corresponding to a desired time varying waveform of the input current and the third signal is based on the actual instantaneous magnitude of the input current and on the first signal. The third signal is a product of a transfer gain which varies monotonically with the first signal and a current sense signal whose magnitude is proportional to the actual instantaneous magnitude of the input current. The first signal is indicative of the desired magnitude of the input current, and the input current control signal controls the relative times at which one or more switches, included in the switching power converter, open and close, as a means of controlling the input current. The controller includes (a) a variable gain element which accepts the first signal and the current sense signal and delivers a third signal which is the product of the current sense signal and a transfer gain which varies monotonically as a function of the first signal, and (b) a current error amplifier which compares the third signal to the second signal, the output of the current error amplifier being delivered as the input current control signal in order to maintain the third signal essentially equal to the second signal, thereby controlling the input current, and so that the magnitudes of the third signal and the second signal are maintained at a level essentially equal to the second signal as the magnitude of the first signal, and hence the magnitude of the input current, vary. The variable gain element may be a multiplier or a divider.

The variable gain element may consist of an electrically controllable resistance having an input port for accepting the first signal and an output port comprising two output terminals. The resistance, R, between the output terminals varies monotonically as a function of the magnitude of the first signal. The current sense signal is a current which flows between the two output terminals, the third signal being the voltage across the two output terminals. For example the electrically controllable resistance may be a field effect transistor, the two output terminals of which are the drain and source terminals of the field effect transistor, the input port comprising the gate terminal of the field effect transistor. In some embodiments, all of the input current flows between the two output terminals. In some embodiments, a fraction of the input current flows between the two output terminals. In some embodiments the current sense signal is delivered to the electrically controllable resistance element by one or more current transformers.

The invention enables the preregulator to take advantage of the fact that many frequently encountered loads can operate over a range of load voltages. From the viewpoints of preregulator efficiency and overall system efficiency and reliability, it is advantageous to vary the voltage which the preregulator delivers to these kinds of loads.

By providing for automatic reduction of output voltage as the magnitude of the input source is reduced, a preregulator according to the present invention will minimize degradation in preregulator conversion efficiency. This is because boost switching power converters necessarily incorporate a shunt current path which carries an average current equal in value to the difference between the average converter input current and the average converter output current. In theory, the current in this shunt path flows losslessly under control of one or more switching elements. In practice, of course, the path is not lossless and the amount of losses will increase as the shunted current is increased. By reducing the output voltage as input voltage is reduced, a preregulator according to the present invention can minimize the average value of the shunted current as input voltage drops, thereby minimizing losses in the shunt current path and improving preregulator conversion efficiency.

Varying the preregulator output voltage can also enhance overall system efficiency and reliability. As preregulator output voltage drops, voltage stresses on components internal to both the preregulator and the load are reduced, and operating voltage margins increased. Also, conversion efficiency of certain post-regulating loads (e.g. DC-DC converters, switching amplifiers) may be improved as load voltage decreases.

Other advantages and features will become apparent from the following description of the preferred embodiment and from the claims.

DESCRIPTION OF THE PREFERRED EMBODIMENT

STRUCTURE AND OPERATION

In most AC operated electronic equipment, the AC input source must first be converted into a DC voltage for use by equipment circuitry. An important figure of merit relative to the AC to DC conversion process is aggregate power factor, which is a measurement of the extent to which rms current drawn from the AC source by an AC to DC converter is useful in delivering DC power to the load. Thus, $$APF = \text{Aggregate Power Factor} = \frac{Pdc}{Vrms \cdot Irms}, \quad (1)$$

where Pdc is the average DC power delivered by the AC to DC converter, Vrms is the rms voltage of the AC source and Irms is the rms current drawn from the source by the AC to DC converter. Simple prior art AC to DC converters, consisting essentially of a rectifier followed by a storage capacitor, exhibit relatively poor aggregate power factor (e.g. 0.5) because the current which they draw from the AC source is severely distorted relative to the voltage waveform. Power factor suffers because the harmonic components of the input current contribute to the rms current drawn but do not contribute to the DC power delivered.

Figure 1:
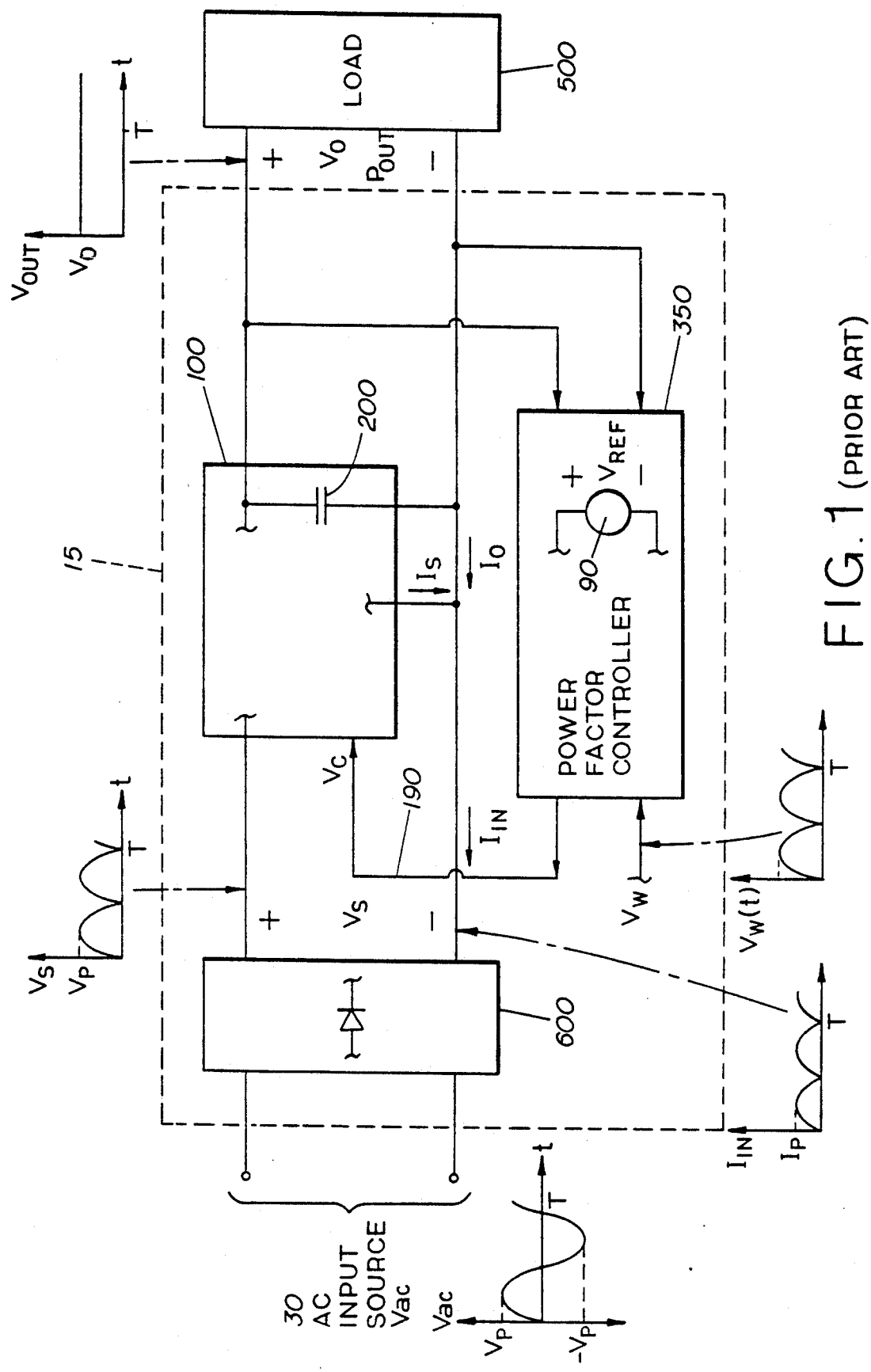
FIG. 1 shows a block diagram of an AC to DC boost switching preregulator.

With reference to FIG. 1, one prior-art technique for actively controlling power factor is to rectify the AC source 30, via a full-wave rectifier 600, deliver the full-wave rectified voltage, Vs, to a boost switching power converter 100, and control the boost converter, via the control signal, Vc, delivered to the boost converter 100 control input 190 by the power factor controller 350, so as to simultaneously hold the converter DC output voltage, Vout, at an essentially constant value, Vo, (indicated by the fixed reference voltage, Vref, of the reference voltage source 90 included within the controller 350 which is greater than the peak value, Vp, of the input source 30, while forcing the converter input current, Iin, to follow a predefined periodic reference waveform, Vw, which is synchronous to each half-cycle of the AC source. Examples of such prior art controllers 350 are described in Wilkerson, U.S. Pat. No. 4,677,366 and Williams, U.S. Pat. No. 4,940,929. In most cases the reference waveform, Vw, is derived from the rectified source voltage, Vs, (as shown in the FIG.) and the input current is forced to follow the sinusoidal variation of the AC source (e.g. as in Wilkerson, Williams); in other cases nonsinusoidal reference waveforms are proposed, such as a rectangular current waveform. Irrespective of the specific waveform chosen, so long as the waveform of the input current is controlled, the harmonic content of the waveform, and hence the power factor of the preregulator 15, will be predictable.

The boost switching converter 100 in FIG. 1 may be any one of a class of switching power converters which deliver power to a load at an output voltage which is greater in value than their input voltage, and which, assuming ideal circuit elements, perform this conversion without power loss. Such converters can maintain active control over output voltage and input current (hence power factor) provided that the converter input voltage is not allowed to exceed the converter output voltage. Thus, the output voltage of prior art preregulators is set to an essentially fixed value which is greater than some desired maximum value of peak source voltage, Vpmax. In many applications, however, the load is capable of operating over a range of load voltages, and the likelihood is small that the performance and reliability of these loads will be optimized at a load voltage selected solely on the basis of peak source conditions. For example, AC to DC preregulators frequently supply power to DC to DC converters, which postregulate the DC output voltage of the preregulator into other equipment voltages, and these DC-DC converters might be capable of operating over a range of load voltages (i.e the voltage delivered to the input of the DC to DC converter from the output of the preregulator) from 180 VDC to 400 VDC. Conversion efficiency for these devices might be optimized for load voltages near 300 VDC, and operating reliability can be expected to improve as load voltage is reduced (owing to reduced voltage stresses on the components within the DC-DC converter). If these loads are continuously operated at a fixed preregulator output voltage which is based solely upon a maximum operating source voltage requirement (e.g. setting the output voltage at 385 VDC to accommodate operation at a maximum source voltage of 270V, rms, (381V, peak)), conversion efficiency and reliability of the loads will be sacrificed.

Continuous operation of the boost switching converter 100 at an elevated, fixed, output voltage also impacts both the conversion efficiency and reliability of the converter whenever the AC source voltage is at a value below Vpmax. This can be demonstrated with reference to FIG. 2, which shows one kind of a prior art boost switching converter 100. In the FIG., the boost switching converter 100 consists of an input inductor 105, a field effect transistor (FET) switch 106, a diode 107 and an output capacitor 100. In operation, the frequency at which the switch 106 is turned on and off during a converter operating cycle is fixed, and the duty cycle of the switch (i.e. the fraction, D, of the time that the switch is on during an operating cycle) is varied as a means of controlling the average value of the shunt current, Is. The inductor 105 smooths the input current, keeping it essentially constant throughout the operating cycle, and the output capacitor 200 smooths the effect of variations in the current Io so that the converter 100 delivers an essentially DC output voltage. When the switch 106 is on, Is is equal to the full input current, Iin, and when the switch is off, Is is zero and the full input current flows through the diode 107 toward the capacitor 200 and the load (not shown). Thus, for example, if the input and output voltages, Vin and Vo, are DC values, and the switch is opened and closed at a duty cycle D, then, to first order, neglecting circuit losses, the average currents (i.e. averaged over a time scale large in comparison to an operating cycle) are: Is = D·Iin and Io = (1−D)·Iin. Conservation of current and energy demand that:

$$Iin = Io + Is \quad (2)$$

$$\text{and, } Vo \cdot Io = Vin \cdot Iin = Vin \cdot Is + Vin \cdot Io. \quad (3)$$

Rearranging Equations 2 and 3:

$$\frac{Is}{Iin} = 1 - \frac{Vin}{Vo} \cdot Is > 0 \quad (4)$$

Since Is can only assume positive values greater than or equal to zero, Equation 4 indicates that Vo must be greater than or equal to Vin, and that the shunt current, Is, increases as the difference between output voltage and input voltage increases. Furthermore, with reference to Equation 3 and FIG. 2, the output power may be viewed as deriving from two components: a "flowthrough power", $P_T = Vin \cdot Io$, and a "processed power", $P_P = Vin \cdot Is$. The flowthrough power, $P_T$, can be viewed as flowing directly from the input source to the converter output via the inductor and the diode; the processed power, $P_P$, is the contribution to output power which results from processing in the shunt path (i.e. the flow of the current Is). Rearranging Equation 4 in terms of $P_P$, $$\frac{Pp}{Pin} = 1 - \frac{Vin}{Vo}. \quad (5)$$

As the difference between Vo and Vin increases, the fraction of input power processed by the converter increases. Although the processing of power associated with the flow of shunt current is theoretically lossless, in a physically realizable converter this is, of course, not the case. Consider, for example, conduction losses in the FET in the shunt path of the converter of FIG. 2. If the FET 106 has an on resistance equal to Rdson, then dissipation in the FET during the FET on-time is Iin²·Rdson. The FET average power dissipation is, therefore, Pfet = Iin²·Rdson·D = Is·Iin·Rdson. Normalizing this to input power:

$$\frac{Pfet}{Pin} = \left(\frac{Is}{Iin}\right) \cdot \frac{Iin}{Vin} \cdot Rdson = \left(\frac{Pp}{P_{in}}\right) \cdot \frac{Iin}{Vin} \cdot Rdson \quad (6)$$

Figure 2:
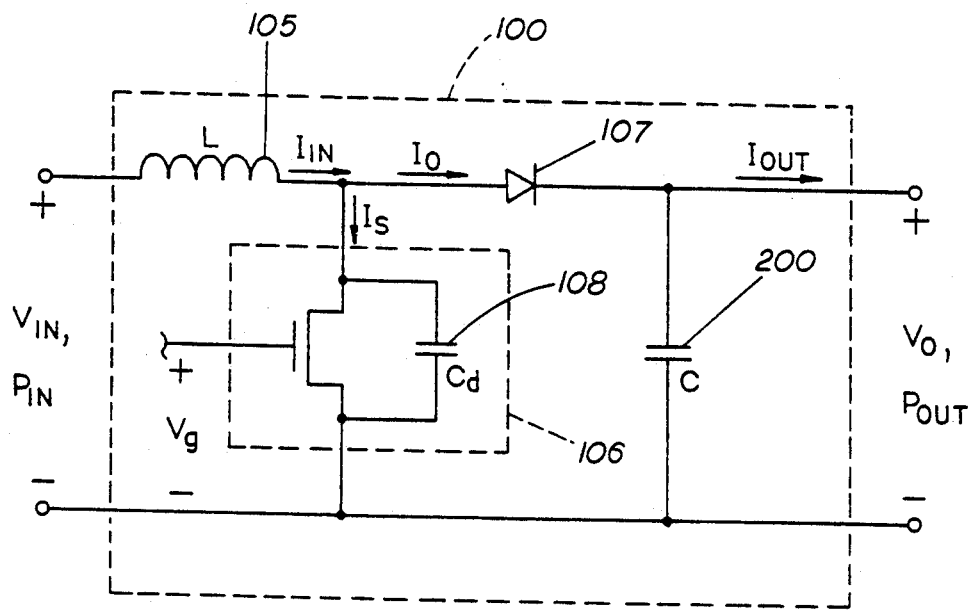
FIG. 2 shows a circuit schematic of a prior art boost switching power converter.

As the fraction of input power processed by the converter increases, so too does the fraction of input power which is dissipated as conduction loss in the FET 106. Equations 5 and 6 indicate that as the value of Vin declines relative to the value of Vo both the amount of power processed and the fraction of power dissipated as conduction losses will increase, and the conversion efficiency of the converter will decline. Said another way, power processing is reduced, and the conversion efficiency of the converter improved, if the difference between converter output voltage and converter input voltage is decreased. In addition to conduction losses, FET losses associated with finite rise and fall times of FET currents and voltages will increase directly with output voltage, and losses associated with the charging and discharging of the FET's intrinsic output capacitance will increase as Vout². Thus, higher values of converter output voltage will translate into increased converter losses. In general, the factors which contribute to losses in the converter of FIG. 2 are present in any boost switching converter topology (e.g. pulse width modulated, zero-current switching, resonant). For example, actual measured efficiency of a zero-current switching boost switching converter (which operates in accordance with the power processing principles described above), powered from a 125 Volt DC input source and delivering 600 Watts to a load, increased from 89% to 95% as the converter output voltage was decreased from 385 Volts to 250 Volts.

It should be apparent that a reduction in processed power will have similar impact on conversion efficiency for either a DC or a time varying input source. For example, if Vin and Iin are rectified sinusoids which are in phase and have peak values Vp and Ip (and, therefore, have average values Vin = (2·Vp)/π, Iin = (2·Ip)/π, the relationships of Equations 5 and 6 (which apply to operation from a DC source), can be shown to be closely approximated by the following Equations:

$$\frac{Pp}{Pin} = 1 - \frac{\pi Vp}{4 \cdot Vo} = 1 - \frac{\pi^2 Vin}{8 \cdot Vo} Is > 0; Vp < Vo \quad (7)$$

and, $$\frac{Pfet}{Pin} = \left(1.08 \cdot \frac{Is}{Iin} - 0.08\right) \cdot \frac{Iin}{Vin} \cdot Rdson. \quad (8)$$

Figure 3:
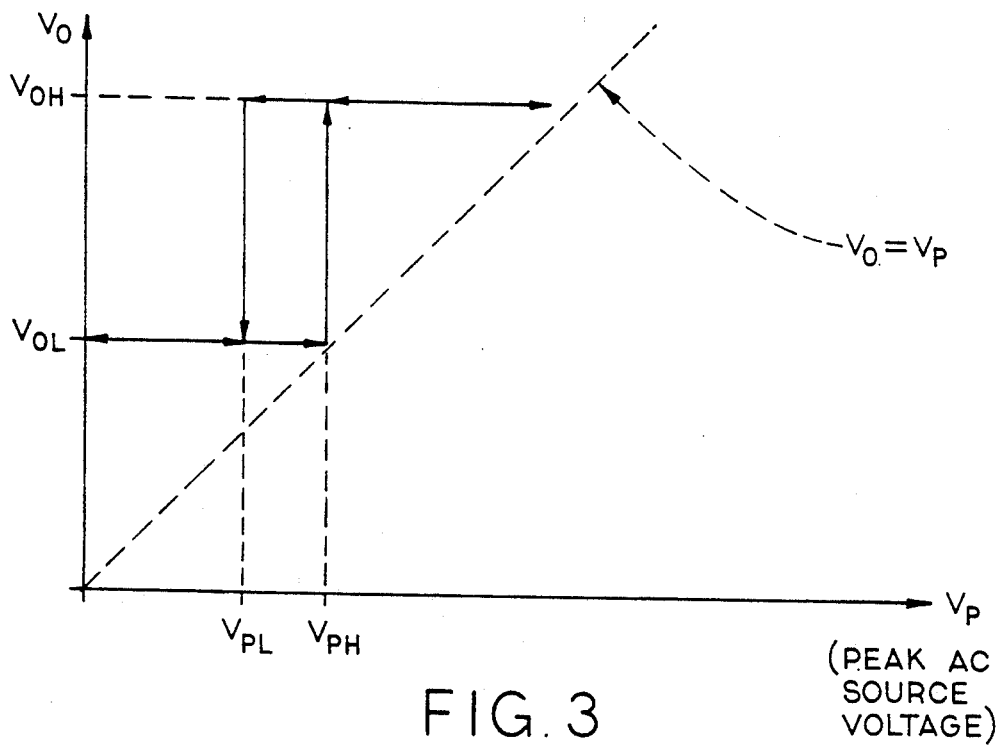
FIG. 3 shows a plot of output voltage as a function of the peak value of AC source voltage for one embodiment of a boost switching preregulator according to the present invention.

In general, the amount of processed power will increase, and the conversion efficiency of a boost switching converter will decrease, (a) as the converter output voltage is increased, and (b) as the difference between the converter output voltage and converter input voltage is increased.

Where the load can accommodate a range of load voltages, a better strategy for controlling the output voltage of the preregulator would take into account AC source variations, preregulator performance and reliability, and load performance and reliability. A good case in point is a power factor correcting preregulator designed for international application which will supply power to DC-DC converters of the kind previously described (i.e. having an operating load voltage range between 180 VDC and 400 VDC). The most common nominal AC utility voltage in the United States is 110 VAC, rms, whereas in Europe 220 VAC, rms, is the norm. Thus, the fixed output voltage of a prior art preregulator designed for international application might typically be set above 385 VDC so that it can accommodate a 20% variation in European voltage. However, if the output voltage is fixed at 385 VDC, then, under worst case operating conditions (for example, operating off of an AC source voltage which is 20% below nominal: 176V, rms, in Europe and 88V,rms, in the United States) the fraction of input power processed by the preregulator would be, from Equation 7, 49% on a European utility line, and 74% on the United States line. If, on the other hand, the output voltage of the preregulator could be automatically reduced to 250 VDC when connected to the United States utility line, the fraction of input power processed at low line would drop to 61%. Clearly, operating the preregulator at a fixed output voltage results in a significant increase in worst case power processing, and an attendant power loss disadvantage, when the unit is operated on a United States utility line. Equally important, operation at a fixed output voltage needlessly sacrifices preregulator power density. Since preregulator electrical and thermal management components must be sized to accommodate the voltages, currents and power dissipation associated with worst case operating conditions, preregulator power density is largely a function of the amount of power processed under worst case conditions. Providing means for automatically reducing converter output voltage as the source voltage drops allows for meaningful improvement in preregulator power density. Thus, as shown in FIG. 3, the output voltage of the preregulator, Vo, might be automatically set to either of two predefined values, Voh and Vol, depending on the magnitude of the AC source. If the peak value of the AC source is greater than Vph, the preregulator output is set to Voh; if the peak value of the AC source is less than Vpl, the preregulator output is set to Vol. A predefined amount of hysteresis, Vh=Vph−Vpl, is also provided to minimize the likelihood that the output of the preregulator will randomly switch between its two predefined values if the source voltage hovers around a value between Vpl and Vph. To ensure that the output voltage is always greater than the peak source voltage, Vpm would be chosen to be greater than Vol. If the maximum anticipated value of United States source voltage is 135 VAC, rms, (190 Volts, peak), and the minimum anticipated peak value of European source voltage is 170 VAC, rms, (241 Volts, peak), then, for example, setting Vph =230V, Vpl=200V, Vol=250V, and Voh=385V, would allow for operation on international utility lines while overcoming the disadvantages, described above, associated with operation at a single fixed value of output voltage.

Figure 4:
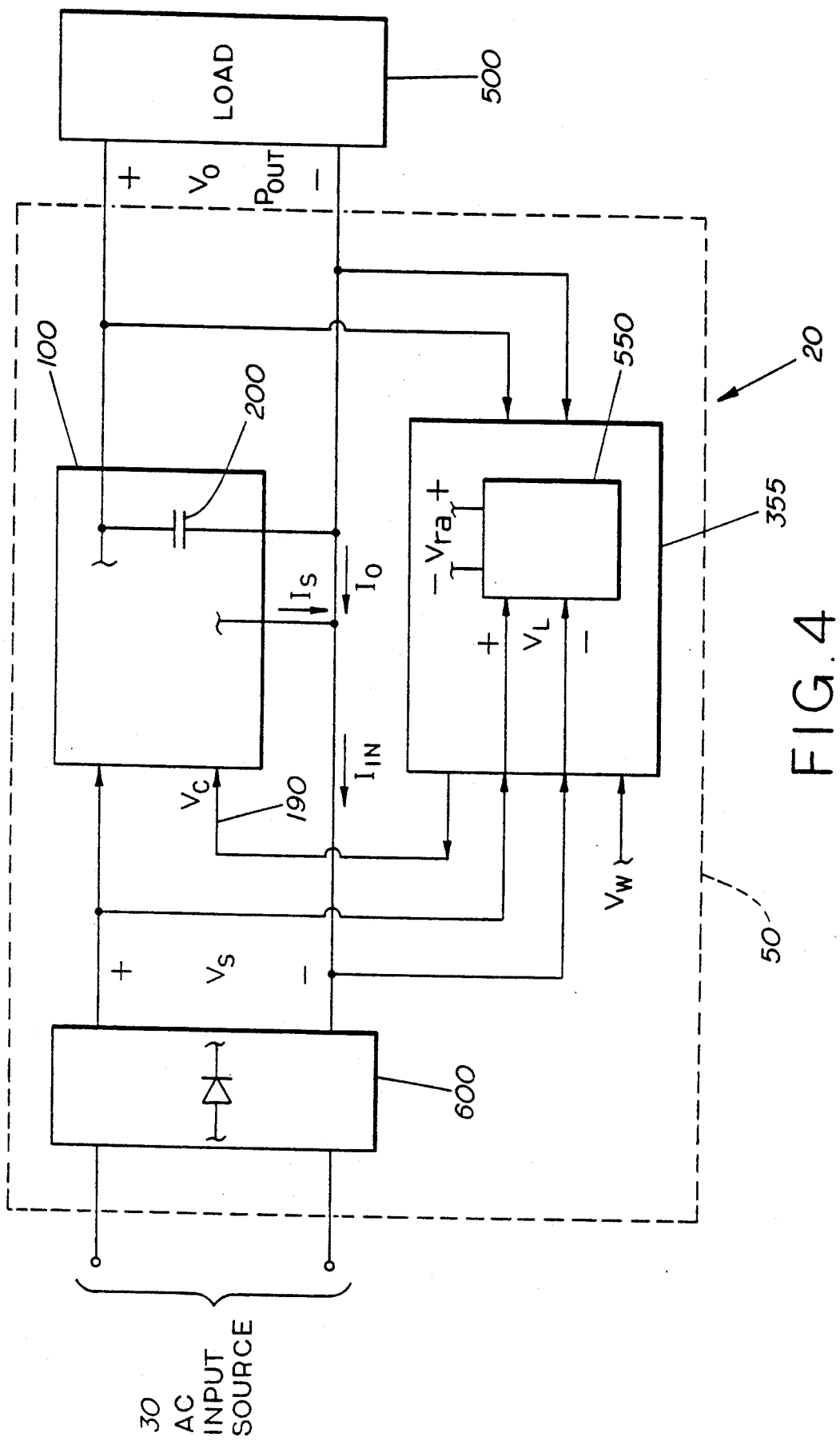
FIG. 4 shows a block diagram which discloses one embodiment of an AC to DC boost switching preregulator according to the present invention.
Figure 5:
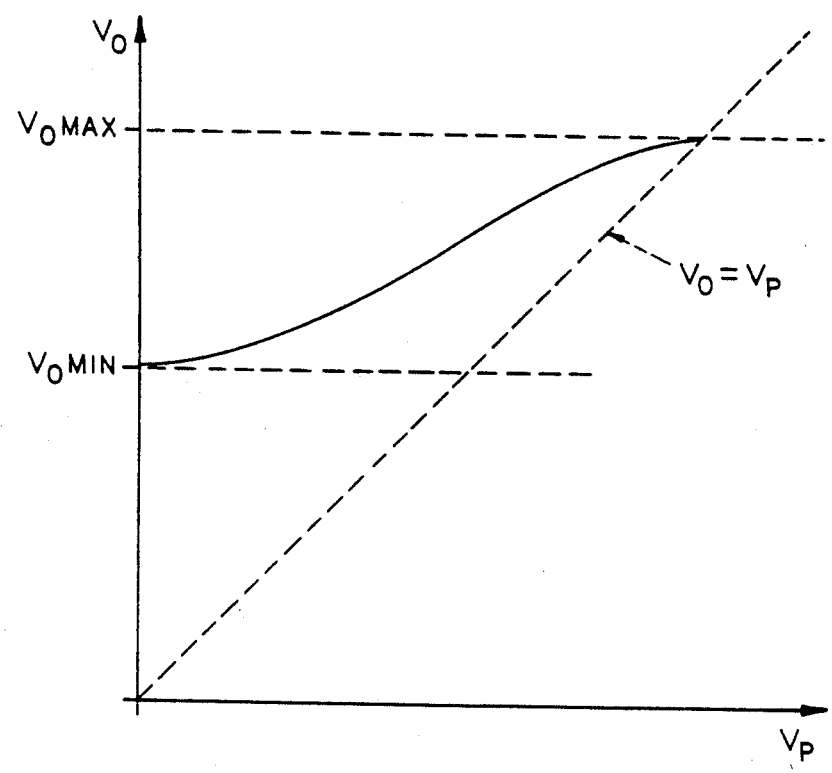
FIG. 5 shows a generalized transfer function relating the output voltage of a boost switching preregulator according to the present invention to the peak value of the preregulator AC input source.

FIG. 4, shows a block diagram of an improved AC to DC switching preregulator which can operate over as wide a range of AC input source voltages as a prior art preregulator, but which, when used with a load capable of operating over a range of load voltages (i.e. at load voltage values between Vomin and Vomax), can increase or optimize the conversion efficiency and reliability of both the AC to DC preregulator and the load by adaptively controlling the load voltage as a function of the voltage of the AC input source. The adaptive AC to DC preregulator 50 shown in the FIG. includes the same functional blocks included in the prior art preregulator 15 of FIG. 1—a full wave rectifier 600, a boost switching power converter 100, and a power factor controller 355—but replaces the fixed reference voltage source 90 of FIG. 1 with an adaptive reference voltage source 55D (FIG. 4). The adaptive reference voltage source 550 accepts an input, $V_L$, indicative of the peak value of the AC source 30, and sets the magnitude of the variable reference voltage, Vra, delivered to the power factor controller 355, in accordance with a predefined relationship between the magnitude of the signal $V_L$ and the load voltage, Vo. As the value of Vra is adjusted, the output voltage of the preregulator 50 varies proportionally: Vo=K·Vra. Thus, instead of regulating the DC output voltage, Vo, of the boost switching converter 100 to an essentially fixed value, the output voltage of the preregulator 50 according to the present invention will be adjusted up or down depending upon the magnitude of the voltage of the AC input source 30. In general, as shown in FIG. 5, the predefined relationship between $V_L$ and Vo is defined so that: a.) the output voltage of the preregulator 50, Vo, is always greater than or equal to the peak value, Vp, of the AC source; b.) the output voltage of the preregulator is always greater than or equal to the minimum operating voltage of the load, Vomin; and c.) the span of values, Vomax−Vomin, over which the output voltage is varied is at least ten percent of the maximum value of the range, Vomax (the latter condition distinguishing the purposeful variation in output voltage in response to changes in input voltage in an adaptive preregulator from the small variations in load voltage that occur in response to changes in input voltage in a prior-art preregulator having an essentially fixed output voltage due to second-order effects (e.g. finite closed loop gain)). By reducing the converter 100 output voltage, Vo, as the source voltage declines, the average value of the shunt current, Is, which flows in a preregulator 50 according to the present invention will be reduced relative to the shunt current which would flow in a prior art preregulator operating at a fixed, higher, output voltage. Therefore, as the source voltage declines, losses in the shunt path in a preregulator 5o according to the present invention will be reduced relative to losses in a prior art preregulator having a fixed output voltage, and a preregulator 50 according to the present invention will, at any given source voltage, exhibit a conversion efficiency which is equal to or better than that of a prior art preregulator. Besides the obvious benefit of reducing the amount of energy wasted as heat, a preregulator according to the present invention provides a corresponding increase in the amount of power available to the load. This will translate into improved Aggregate Power Factor (Equation 1) and will increase the absolute amount of power which may be delivered to a load where limits are imposed on the electrical ratings of input source connections (e.g. safety agency ratings limit the current which may be drawn from a standard US wall plug to 12 Amperes, rms). Furthermore, the reliability of a system 20 (FIG. 4) incorporating a preregulator according to the present invention will be improved as the source voltage declines since voltage stresses on both the preregulator 50 and the load 500 will be reduced. Finally, since in most applications the occurrence of maximum peak source voltage is a transient event and the steady-state magnitude of source voltage is, on the average, lower (e.g. 10% or more below the anticipated maximum value), a preregulator 50 according to the present invention allows for improving overall system performance by automatically adapting the load voltage to more closely match values which improve the performance of the load (e.g. conversion efficiency).

Figure 6:
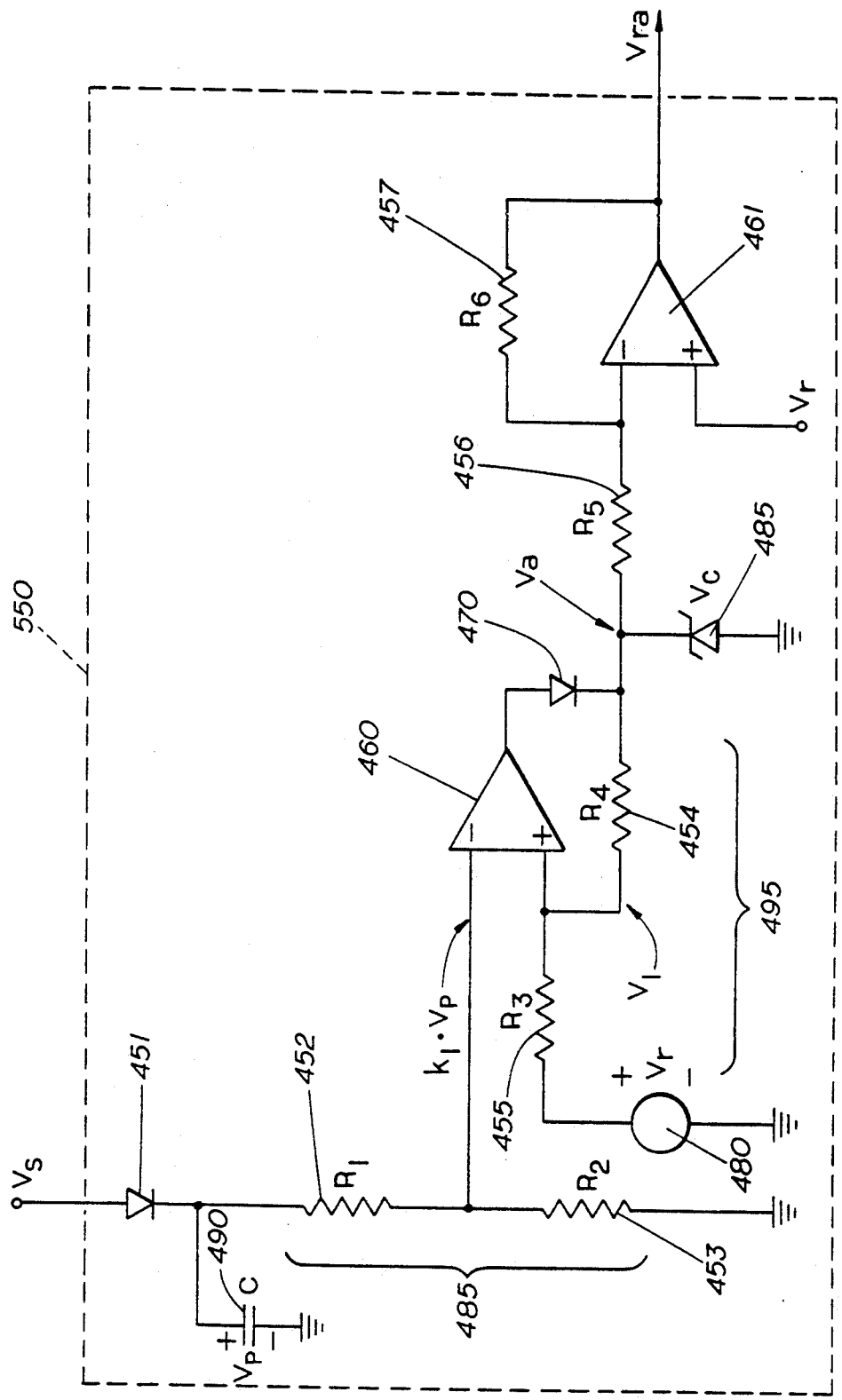
FIG. 6 shows one embodiment of an adaptive reference voltage source which can be used to generate the input-output voltage relationship shown in FIG. 3.

In any specific application, the predefined relationship between the preregulator $o output voltage, Vo, and the magnitude of the AC source 30 voltage would be chosen based upon: the characteristics of the AC source and the anticipated range of variation of the source voltage; the operating load voltage range of the load; and the performance characteristics of the load as a function of load voltage. Once the relationship between output voltage and source voltage is defined, an adaptive voltage reference source $$o (FIG. 4) is implemented to generate the variable reference voltage, Vra. There are, of course, many different ways of defining and implementing such a source 550. One way shown in FIG. 6, can be used to achieve the two-level output voltage transfer function shown in FIG. 3. In FIG. 6, the two-level adaptive voltage reference source 550 is comprised of a first diode 451; a filter capacitor 490; a first divider 485, consisting of resistors R1 452 and R2 453, having a first division ratio, $K1=R2/(R1+R2)$; a second divider 495, consisting of resistors R3 455 and R4 454, having a second division ratio $K2=R3/(R3+R4)$; a comparator 460; a second diode 470; a clamp diode 485 which clamps the voltage, Va, to a maximum value of Vc; a fixed reference voltage source 450, of value $Vr<Vc$; an operational amplifier 461; and resistors R5 456 and R6 457, whose values are in the ratio $K3 = R6/R5$. One side of the first diode 451 is connected to receive the periodic voltage waveform, Vs, delivered by the full wave rectifier 600 (FIG. 4). The diode is poled so that the filter capacitor 490 is charged to the peak value, Vp, of Vs, and the capacitance, C, of the filter capacitor 490 is selected so that time constant, $T1=C\cdot(R1+R2)$, is large compared to the period of Vs. As a result, the DC voltage across the filter capacitor 490 follows the peak value, Vp, of the AC source. When the voltage, $K1\cdot Vp$, delivered to one of the comparator 460 inputs by the first divider 485, is below Vr, the output of the comparator is high and the clamp diode sets the voltage Va $=Vc$. The comparator threshold voltage, V1, at the other comparator 460 input is then:

$$V1 = Vt1 = Vr + (Vc - Vr) \cdot K2. \quad (9)$$

If the voltage Vp is increased above a value $$Vph = Vt1/K1 \quad (10)$$

$$Vph = Vt1/K1 \quad (10)$$

the comparator output will go low (i.e. to a voltage value less than Vr); the second diode 470 will block; both of the voltages Vc and V1 will become equal to Vr, and the comparator threshold voltage $V1 = Vt2 = Vr$. Thus, the comparator output will remain at the value Vr until Vp declines below:

$$Vpl = Vt2/K1 = Vr/K1 \quad (11)$$

which is less than Vph. The difference between Vph and Vpl (e.g. in FIG. 3, the amount of hysteresis) is therefore:

$$Vh = (Vc - Vr) \cdot K2/K1 \quad (12)$$

Since the voltage Va assumes only two values, Vr and Vc, the output voltage, Vra, delivered by the amplifier 461 (i.e.the reference voltage which is delivered to the controller 355 of FIG. 4) will also assume two values:

$$Vral = Vr - (Vc - Vr) \cdot K3, \text{ if } Va = Vc \quad (13)$$

$$Vrah = Vr, \text{ if } Va = Vr. \quad (14)$$

If the proportionality factor between the adaptive reference voltage, Vra, and the preregulator 50 (FIG. 4) DC output voltage is K4, then the two corresponding values of preregulator output voltage, Voh and Vol (FIG. 3), will be:

$$Vol = K4 \cdot (Vr - (Vc - Vr) \cdot K3) \quad (15)$$

$$\text{and } Voh = K4 \cdot Vr \quad (16)$$

For a given set of values K4, Voh, Vol, Vph, and Vpl, Equations 9 through 16 can be used to solve for appropriate values of K1, K2, K3, Vr, and Vc. For example, if $K4=100$, and the desired voltage values are $Vol=250V$, $Voh=385V$, $Vpl=200V$ and $Vph=230V$, then $Vr=3.85V$, $Vc=5.1V$, $K1=.0193$, $K2=0.46$, and $K3=1.08$.

Figure 8:
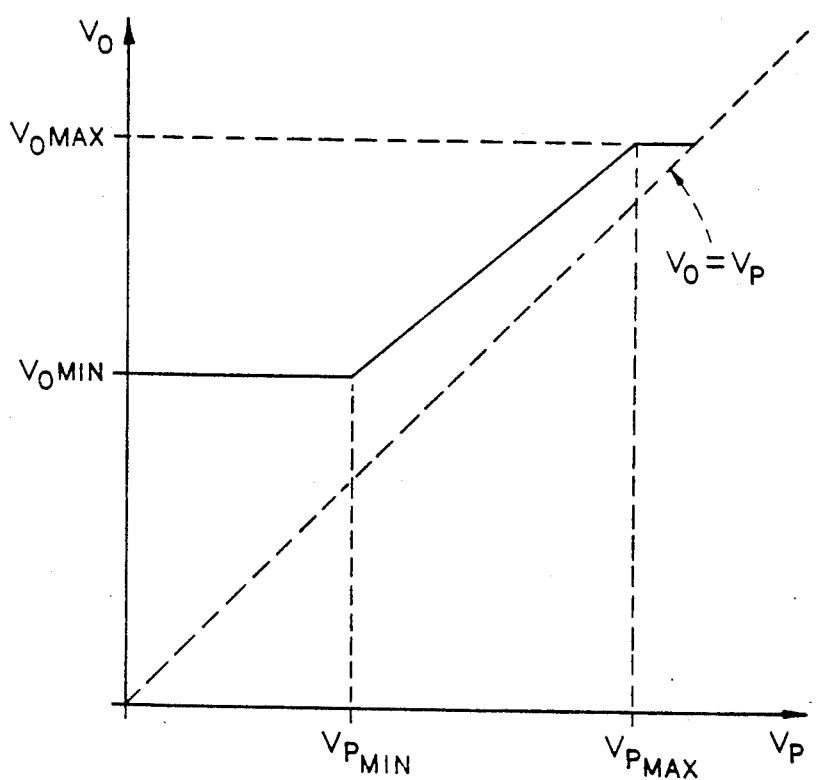
FIG. 8 shows the input-output voltage relationship of an embodiment of an AC-DC boost switching preregulator which includes the adaptive reference voltage source shown in FIG. 7.
Figure 7:
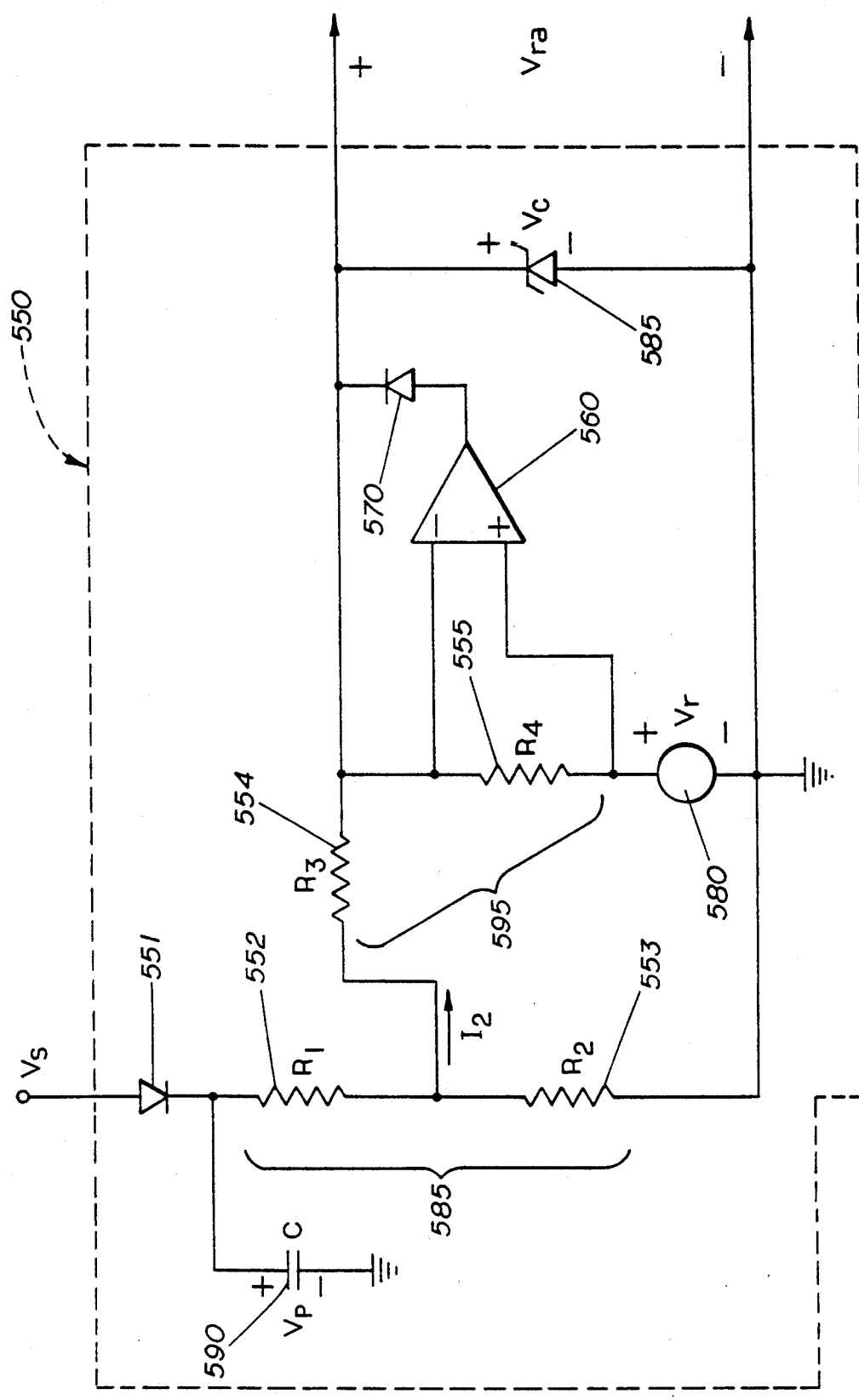
FIG. 7 shows an alternate embodiment of an adaptive reference voltage source.

Another embodiment of an adaptive voltage reference source, shown in FIG. 7, has the transfer function shown in FIG. 8. In FIG. 7, the adaptive voltage reference source 550 is comprised of a first diode 551; a filter capacitor 590; a first divider 555, consisting of resistors R1 552 and R2 553, having a first division ratio, $K1=R2/(R1+R2)$; a second divider $9$$, consisting of resistors R3 554 and R4 555, having a second division ratio $K2=R4/(R3+R4)$; a second diode 570; a fixed reference voltage source 580 of value Vr; an operational amplifier 560; and a clamp diode 585 which clamps the voltage Vra to a maximum value of Vc. One side of the first diode 551 is connected to receive the periodic voltage waveform, Vs, delivered by the full wave rectifier 6?c (FIG. 4). The diode is poled so that the filter capacitor 590 is charged to the peak value, Vp, of Vs, and the capacitance, C, of the filter capacitor 590 is selected so that time constant, $T1=C\cdot(R1+R2)$, is large compared to the period of Vs. As a result, the DC voltage across the filter capacitor 590 follows the peak value, Vp, of the AC source. The high gain operational amplifier 560 will attempt to adjust the voltage at the junction of resistors R3 554 and R4 555 so as to maintain the voltages at each of the amplifier's 560 inputs in equality. However, because of the presence of the second diode 570, the amplifier 560 cannot draw current away from the junction of R3 $54 and R4 555. Therefore, when Vp assumes values such that $K1\cdot Vp$ is greater than Vr (and current, 12, flows in the second divider 595 in the direction indicated by the arrow (FIG. 7)), the amplifier 560 will be unable to sink current from the junction of R3 554 and R4 555 and the voltage Vra will equal:

$$Vra = K1 \cdot K2 \cdot Vp + (1 - K2) \cdot Vr \quad K1 \, Vp > Vr. \quad (17)$$

The clamp diode 585 sets an upper limit, $Vc > Vr$, on the value of Vra. On the other hand, when Vp assumes values such that $K1\cdot Vp$ is less than Vr, the amplifier 560 will be able to deliver current to the junction of R3 554 and R4 555, via the second diode 570, and will maintain the voltage, Vra, equal to Vr. Thus:

$$Vra = Vr \quad K1 \cdot Vp < Vr \quad (18)$$

If, in the preregulator 50 of FIG. 4, the constant of proportionality between the load voltage, Vo, and the variable reference voltage, Vra, is K3, then the output voltage, Vomin, corresponding to minimum value, Vr, of Vra (Equation 18) is:

$$Vomin = K3 \cdot Vr; \qquad (19)$$

the peak source voltage, Vpmin, below which this output will be maintained is:

$$Vpmin = Vr/K1 = Vomin/(K1 \cdot K3); \qquad (20)$$

and, for peak source voltages above Vpmin, the preregulator output will be:

$$Vo = K1 \cdot K2 \cdot K3 \, (Vp - Vpmin) + Vomin \quad Vp > Vpmin. \qquad (21)$$

The clamp voltage, Vc, corresponds to a maximum output voltage, Vomax = K3·Vc. The slope of the linear section of the transfer function (FIG. 8) is:

$$K1 \cdot K2 \cdot K3 = (Vomax - Vomin)/(Vpmax - Vpmin). \qquad (22)$$

The values of K1, K2, and K3 are selected to define a particular transfer function. Assume, for example, that the controller 355 of FIG. 4 is characterized by a gain K3=100 (i.e. Vo=100·Vra) and it is desired that Vomax=390 VDC, Vomin=300 VDC, Vpmin=270V and Vpmax=380V. Then, Vc=3.9V, and from Equation 19, Vr=3.0V, and, from Equations 22 and 20, K2=0.74 and K1=0.0111.

A simplified version of the adaptive reference source 550 of FIG. 7 can be implemented by removing the amplifier 560 and the second diode 570. The transfer function will be the same as that shown in FIG. 8, except that the preregulator output voltage will not be clamped to Vomin as the peak source voltage drops below Vpmin. Instead, the output voltage will continue to decline at the slope predicted by Equation 22 as the peak source voltage drops below Vpmin.

One tradeoff associated with applying an adaptive preregulator in place of a prior art preregulator having a fixed output voltage is that, to achieve equivalent holdup time (i.e., with reference to FIGS. 1 and 4, the amount of time that the energy stored in the output capacitor 200 of the boost switching converter 100 can, by itself, maintain the preregulator output voltage within the operating range of the load 500), the output capacitor 200 in the adaptive preregulator wi)1 have to be larger in value. It can be shown that to achieve equivalent holdup time, the ratio, Rh, of the capacitance required in an adaptive preregulator to that required in a prior art preregulator is:

$$R_h = \frac{V_{op}^2 - V_{opmin}^2}{V_{omin}^2 - V_{opmin}^2}, \qquad (23)$$

where Vop is the output voltage of the prior art preregulator, Vopmin is the minimum operating voltage of the load, and Vomin is the minimum output voltage delivered by the adaptive preregulator (Vop>Vomin>Vopmin). Thus, for example, if the fixed output voltage of a prior art preregulator, Vop, is 385 Volts DC, the minimum value of the output voltage of an adaptive preregulator is 250 VDC, and the minimum operating voltage of a load is 180 VDC, then Rh =3.8, and the adaptive preregulator will require an output capacitor having 3.8 times the capacitance needed in a prior art preregulator. However, by reducing the amount of power being processed, the adaptive preregulator affords benefits which overwhelm the size and cost penalty associated with a larger output capacitor: significant reduction in wasted energy and heat and a corresponding increase in available load power; improvement in preregulator size, cost and reliability; reduction in voltage stresses on both the preregulator and load when operation is at reduced values of source voltage and concomitant improvements in both load performance and reliability.

It should be apparent that the inventive concepts which have been described in relation to adaptive AC to DC switching preregulators also apply to boost switching preregulators which operate off of DC input sources.

Figure 9:
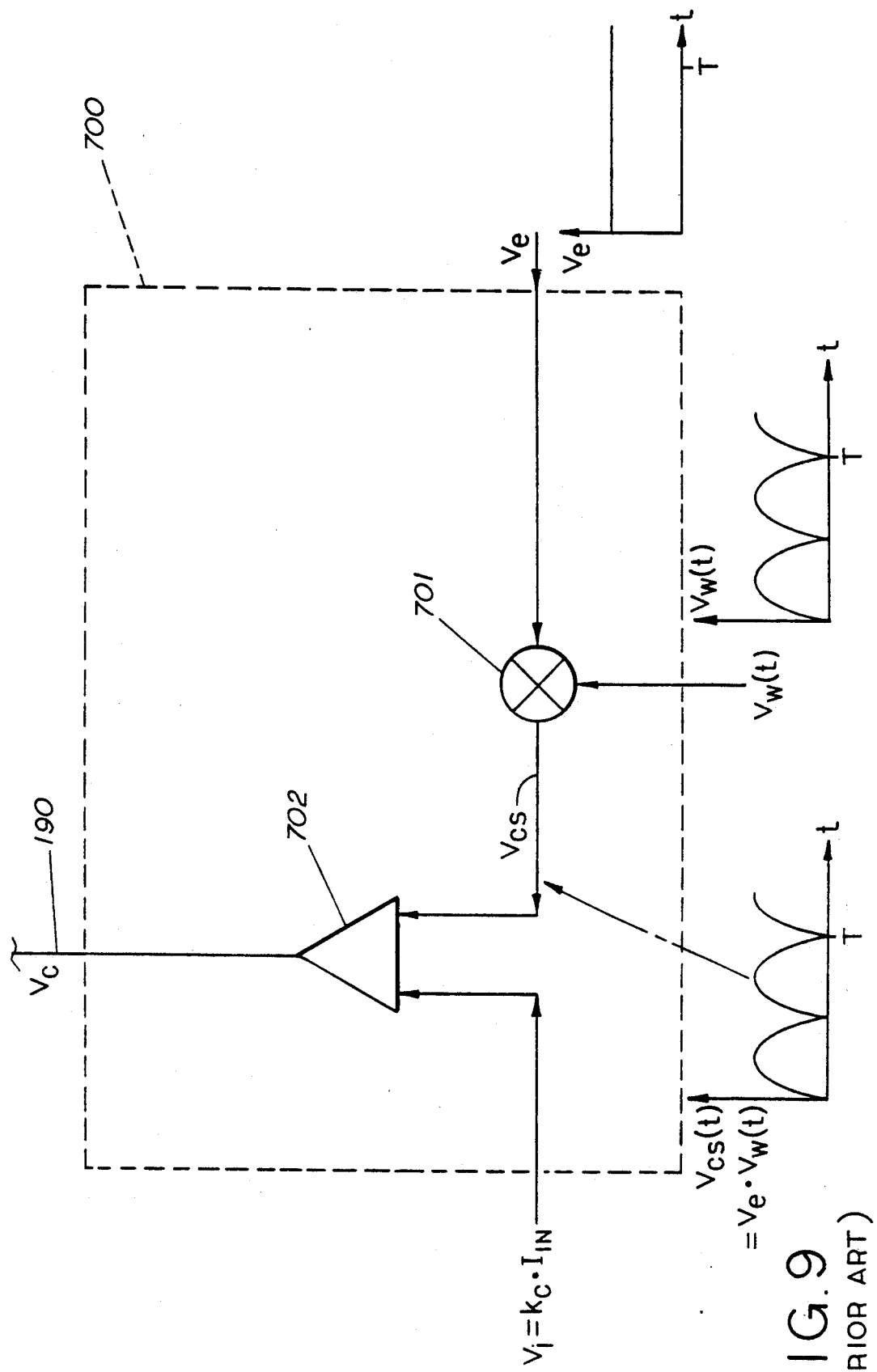
FIG. 9 shows a block diagram of a prior art current controller.

In another aspect, the present invention includes an improved method for sensing and controlling the input current of AC to DC switching preregulators. Prior art methods for controlling this current have traditionally relied upon sensing the input current with an element having an essentially fixed transfer function (e.g. a resistor or one or more appropriately applied current transformers) and controlling the boost switching converter on the basis of a comparison of the signal delivered by the sensing element to a current setpoint signal having a waveform and magnitude indicative of the desired converter input current. For example, in FIG. 9, which shows a prior art current controller 700, the current error amplifier 702 compares the current sense signal, Vi =Kc*Iin (where Kc is the fixed transfer gain of the sense element, e.g. its resistance or turns ratio) to a current setpoint signal, Vcs(t), and delivers a control signal, Vc, to the boost control input 190 of the boost switching converter (not shown) as a means of maintaining the current sense signal, Vi, equal to the setpoint waveform Vcs(t). Thus, Iin =Vcs(t)/Kc. The current setpoint signal, Vcs(t), delivered to one input of the error amplifier 702 by the multiplier 701, is the product of a reference waveform Vw(t) (which, as shown in the FIG., has a sinusoidal time variation corresponding to the waveform of the rectified AC source voltage (not shown)) and a signal Ve (which, under steady-state conditions would be an essentially DC value whose magnitude is adjusted by a voltage error amplifier (not shown) as a means of maintaining the preregulator output voltage at some desired value, Vo). Thus, Vcs(t) =Vw(t)*Ve, with the reference waveform, Vw(t) defining the time variation of Vcs(t), and the signal Ve adjusting the magnitude. As a result, for any given value of Ve, Iin =Vcs(t)/Kc =Ve*Vw(t)/Kc. In this way the magnitude of the input current, Iin(t), can be controlled to be at a value which is consistent with maintaining the preregulator output at some desired DC output voltage, Vo, and the waveform of the input current can be simultaneously forced to follow the time-variation of the reference waveform, Vw(t). As the load on the preregulator, and hence magnitude of the input current, Iin, is reduced, the magnitudes of both the current setpoint waveform, Vcs(t), and the current sense signal, Vi, will also decline. As these signal levels become smaller, second order effects (e.g. error amplifier 70 offset voltages, effects of boost converter switching noise) will become more pronounced, and the degree to which the input current waveform faithfully follows the waveshape of the setpoint waveform will be degraded. The problem is that the current error amplifier 702 is called upon to perform its function while comparing waveforms which, in response to variations in preregulator loading, vary over a wide dynamic range of values.

Figure 10:
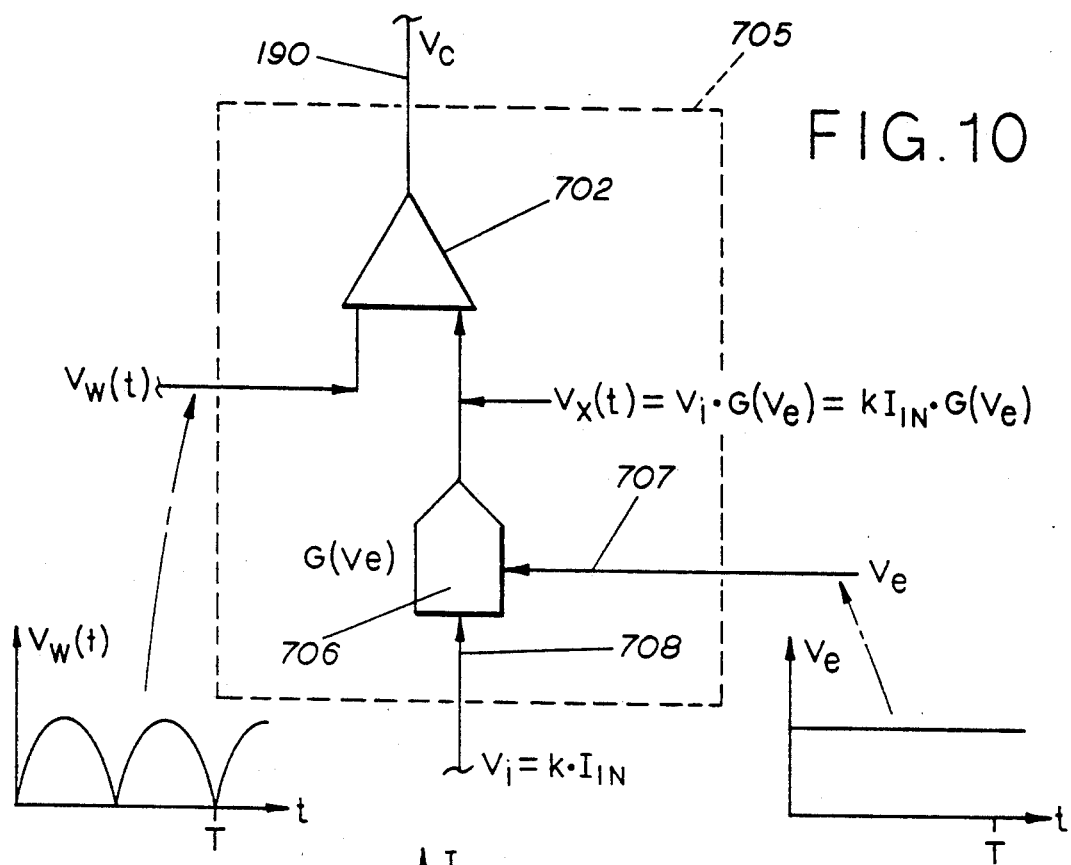
FIG. 10 shows a block diagram of gain-variable current controller according to the present invention.

FIG. 10 shows an improved current controller 705 which overcomes the dynamic range problem characteristic of prior art current controllers. In the FIG., the reference waveform, Vw(t) is supplied to one input of the current error amplifier 702 and a composite signal, Vx(t), is supplied to the other input by a variable gain element 706. The variable gain element has two inputs, a gain control input 707 and a signal input 708, and is characterized by a transfer gain, G(Ve), which varies monotonically with the gain control signal, Ve, delivered to its gain control input 707 The output, Vx(t), of the variable gain element 706 is the product of the transfer gain and the current sense signal, Vi, delivered to the signal input 705. Thus, in the FIG., Vx(t) =K*Iin*G(Ve). A multiplier or a divider are examples of such a variable gain element. Like the prior art current controller 702 of FIG. 9, the output of the current error amplifier 702 is delivered to the boost control input 190 of the boost switching converter (not shown) as a means of maintaining the signal Vw(t)=Vx(t). Thus, for the gain-variable current controller 705 of FIG. 10, Iin=Vw(t)/(K*G(Ve)). As before, the waveform of the input current will correspond to the reference waveform, Vw(t), and the magnitude of the input waveform is varied by adjusting the value of Ve (thereby varying the gain G(Ve)). However, in the gain-variable current controller 705 of FIG. 10, the steady-state magnitudes of the signal inputs to the current error amplifier, Vw(t) and Vx(t), are dependent only on the magnitude of the reference waveform signal Vw(t) and not on the load-dependent dynamic range of the input current. Thus, as variations in load cause the magnitude of the input current to vary, the gain, G(Ve), of the variable gain element 706 is varied as a means of keeping G(Ve)*Iin(t) =Vw(t). If the magnitude of Vw(t) is fixed, increasing the gain will cause a decrease in the magnitude of Iin(t) and decreasing the gain will cause an increase in the magnitude. In this way, Iin(t) can be controlled over a wide dynamic range while keeping the magnitudes of the signals at the two inputs to the current error amplifier 702 at a relatively high level equal to the magnitude of Vw(t).

Figure 11:
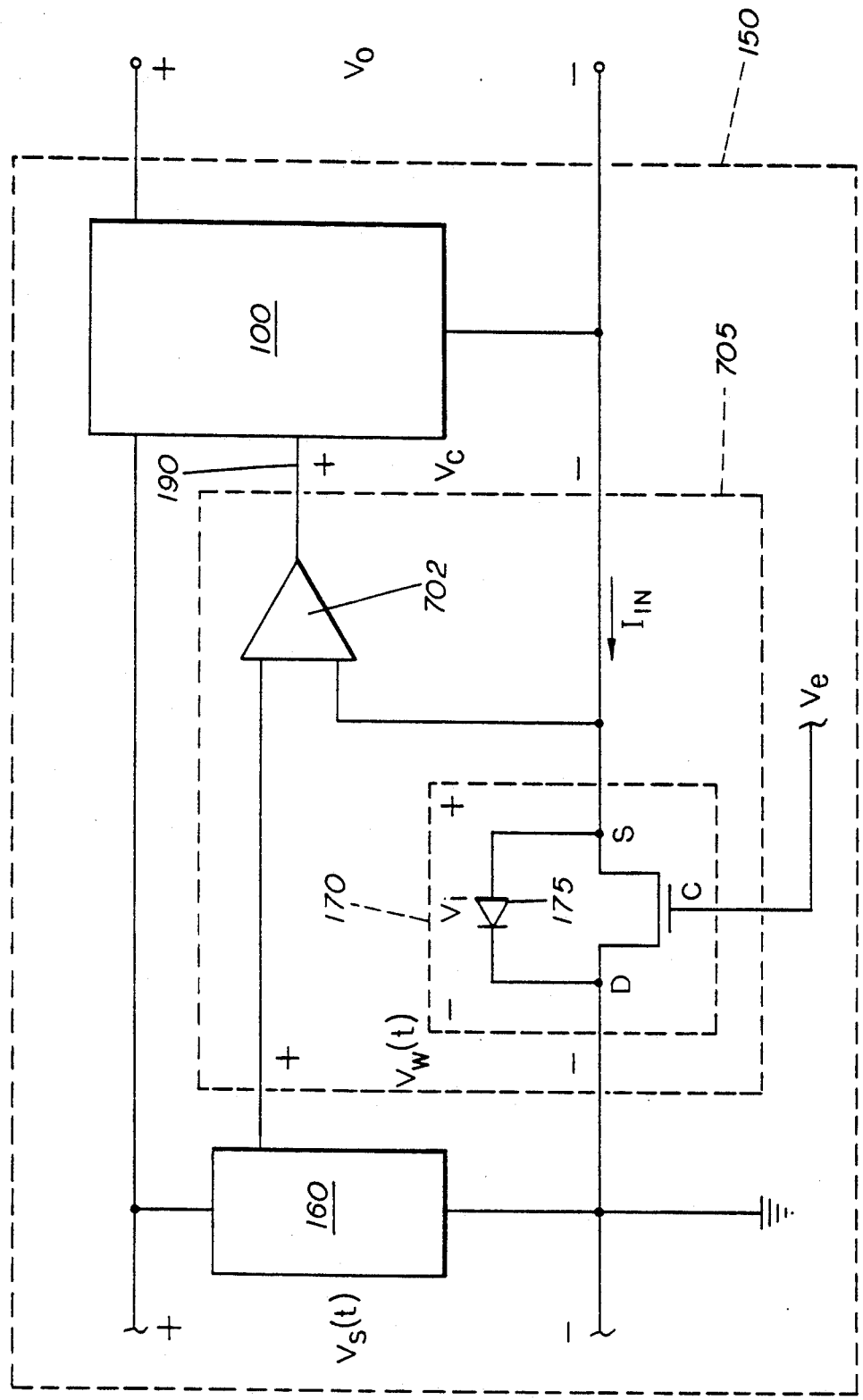
FIG. 11 shows one embodiment of a gain-variable current controller using a field effect transistor as a variable gain element.
Figure 12:
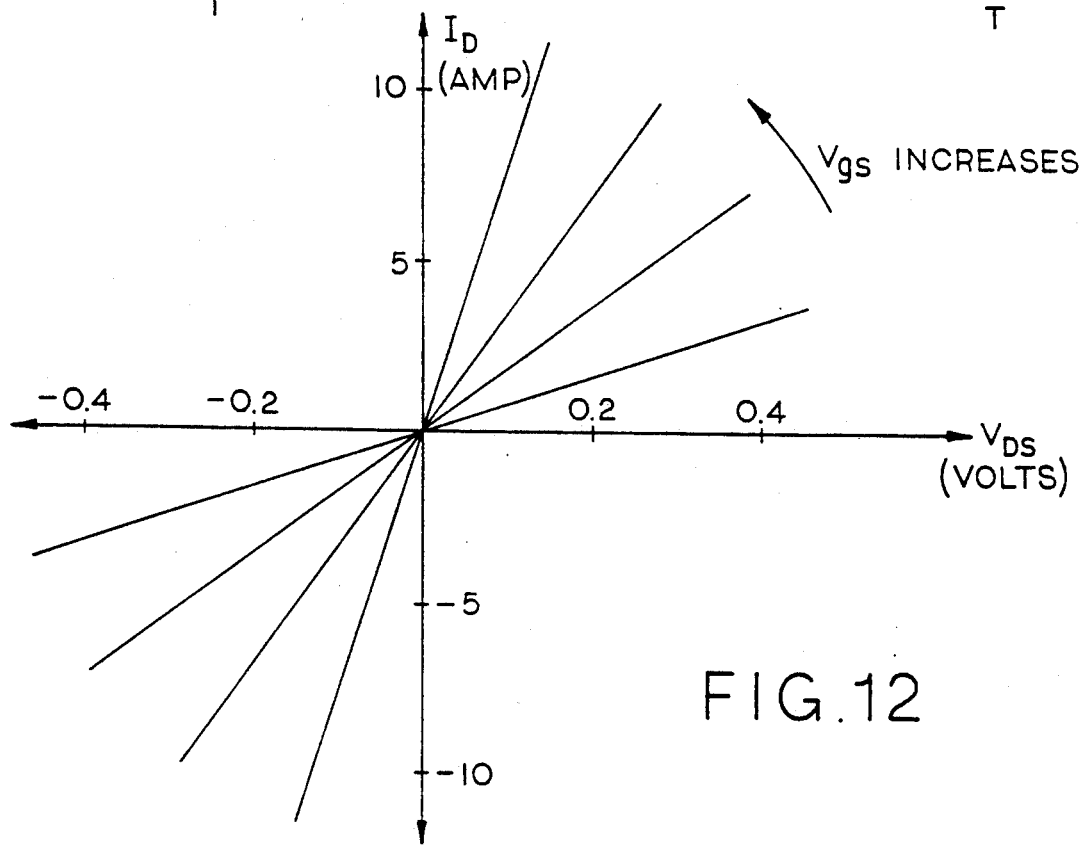
FIG. 12 shows the relationship between drain-to-source voltage and drain current for an n-channel enhancement mode field effect transistor in the "triode" region of its operating range.

FIG. 11 shows a portion of an AC to DC preregulator 150 which includes details of one embodiment of a gain-variable current controller 705. The current controller 705 consists of an n-channel enhancement-mode field effect transistor (FET) 170; a current error amplifier 702; and a voltage divider 160 which delivers a reference waveform signal, Vw(t), which is a fraction of the rectified source voltage, Vs(t), to one input of the current error amplifier 702. The FET 170 serves as the variable gain element and carries the full input current, Iin. FIG. 12 shows the relationship between the drain-to-source voltage and the drain current of a typical FET in the "triode" region of its operating range (e.g. at low drain to source voltages). In this region, for a fixed value of gate-to-source voltage, Vgs, the FET appears as an essentially constant resistance: Vds/Id =Rf(Vgs). As the gate-to-source voltage increases the resistance decreases; as the gate-to-source voltage decreases, the resistance increases. As a result, for a fixed value of gate-to-source voltage, the drain-to-source voltage across the FET will be proportional to drain current Vds(t)=Ids(t)*Rf(Vgs). In FIG. 11 the drain-to-source voltage of the FET 170, Vi, is delivered to one input of the current error amplifier 702 and the output of the divider 160, Vw(t), is delivered to the other input. The divider 160 is arranged so that, as the rectified source voltage, Vs(t), varies over its range of values, the peak value of the voltage Vw(t) remains within the range of drain-to-source voltages that characterize the "triode" operating region of the FET 170 (typically below 0.6V). The output of the current amplifier 702 is delivered to the control input 190 of the boost switching converter 100 and controls the converter 100 as a means of maintaining Vi=VW(t). Thus, Iin(t)=Vw(t)/Rf(Ve), and, as the voltage Ve is increased, the resistance, Rf(Ve), will decrease and the magnitude of the current will increase. If Ve is an essentially DC voltage (e.g. very slowly varying in comparison to Vw(t)), adjusting the magnitude of Ve will adjust the magnitude of Iin(t) and the time variation of Iin(t) will follow the time variation of Vw(t). Thus, by adjusting the resistance of the FET 170, Iin(t) can be controlled over a wide dynamic range while keeping the magnitudes of the signals at the two inputs to the current error amplifier 702 at a relatively high level equal to the magnitude of Vw(t).

Selection of the FET 170 in the gain-variable current controller 705 of FIG. 11 Would be based upon the minimum value of Rf that needs to be achieved, and, in this regard, both the Rdson specification for the FET and the dynamic range of the magnitude of Vw(t) are the primary FET selection criteria. Assume, for example, that the voltage divider 160 of FIG. 11 is a resistive divider. Also assume that it is desired to operate at AC source voltages which range from 90 VAC, rms, to 270 VAC, rms. Under these circumstances, the peak value of Vw(t) will vary over a three-to-one dynamic range. To stay within the "triode" operating region of the FET, the FET voltage (hence the peak value of Vw(t)) might be kept below a peak value of 0.5 Volts. Thus, the divider resistor values would be chosen to generate a Vw(t) having a peak value of 0.5V when the AC source voltage is 270 VAC, rms. At 90 VAC, rms, the peak value of Vw(t) would then be 0.17V. Maximum peak input current occurs under conditions of low line and full load, and, under these conditions, the FET Rdson should not result in a Vds which is greater than 0.17V. Thus, for a 600W preregulator 150 which must operate down to 90 VAC, rms, the maximum operating input current would be 6.7 Amperes, rms, and the peak value of the current would be 9.4 Amperes. To keep the Vds of the FET below 0.17V would require that the Rdson be below 18 milliohms. Commercially available devices exhibit Rdson below this value (e.g. below 10 milliohms). For higher currents, multiple FETs can be paralleled. As the current, Iin, increases, Ve will also increase and, although the FETs will not necessarily carry equal fractions of the current, as Ve is increased, the FETs which are carrying a relatively small fraction of the current will smoothly pick up a larger incremental share as other FETs, already heavily conducting, pick up much smaller increments. It should also be noted that, in FIG. 11, the n-channel FET 170 is connected "backwards": current entering the source terminal (labeled "s" in the FIG.) results in a positive source-to-drain voltage (i.e. a negative drain-to-source voltage). This is acceptable from an operating viewpoint, since, as shown in FIG. 12, the "triode" region is symmetrical through zero. For a given Vgs, the FET resistance will remain essentially constant for either positive or negative values of Vds. The benefit of connecting the FET 170 in this way is that the intrinsic body diode 175 of the FET can, in the event of a preregulator 150 overload, carry large currents while limiting the Vds of the FET 170 to a value equal to the voltage drop in the body diode 175 (typically less than 1 Volt). This also has the beneficial effect of requiring a FET 170 with a breakdown voltage rating below 1 volt.

Figure 13:
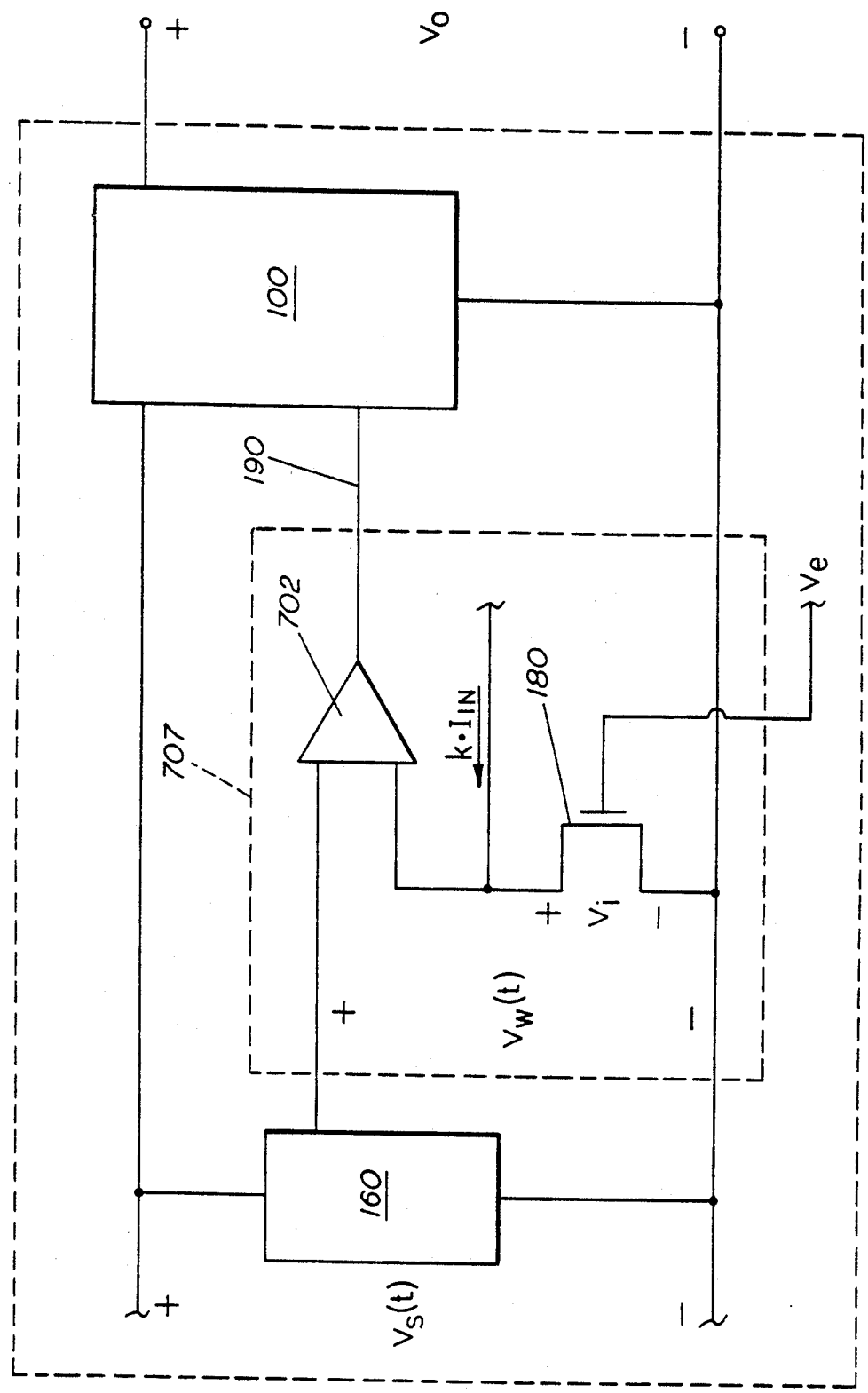
FIG. 13 shows an alternate embodiment of a gain-variable current controller using a field effect transistor as a variable gain element.

Another embodiment of a gain-variable current controller 707 is shown in FIG. 13. In the FIG. a fraction of the converter input current, K*In, (delivered by one or more current transformers appropriately located within the boost converter and not shown in the FIG.) is delivered to a FET 180, as is the gain control voltage Vc. As in the controller of FIG. 11, a reference waveform, Vw(t), is delivered to one input of a current error amplifier 702 and the voltage across the FET 180, Vi, is delivered to the other. Other than the fact that the FET 180 in FIG. 13 carries a smaller current than the FET 170 in FIG. 11, the operating principles, and FET selection criteria, are the same for both current controllers 705, 707.

It should be clear that any element having an electrically controllable resistance can be used in place of the FET in either of the current controllers of FIGS. 8 and 10.

Other embodiments are within the scope of the following claims.

What is claimed is:

1. A boost switching preregulator comprising
   boost switching power conversion means for converting power from a source of unipolar input voltage for delivery as a unipolar output voltage to a load, and
   control means which accepts an input indicative of the magnitude of said unipolar output voltage and which, in response to variations in the magnitude of said unipolar input voltage, controls said boost switching power conversion means such that the magnitude of said unipolar output voltage varies within a range such that (a) said unipolar output voltage is greater than or equal to the magnitude of said unipolar input voltage, and (b) the span of said range is at least ten percent of the maximum value of said unipolar output voltage;
   wherein said unipolar input voltage is a time-varying unipolar voltage derived from an AC source and having a peak value Vp, and said control means varies the value of said unipolar output voltage Vo within said range such that Vo is greater than or equal to Vp.

2. The preregulator of claim 1 wherein said range falls within a predetermined spread of operating load voltages associated with said load.

3. The preregulator of claim 1 wherein said control means causes said unipolar output voltage to increase (decrease) as said unipolar input voltage increases (decreases).

4. The preregulator of claim 1 wherein said controller varies said unipolar output voltage between two values.

5. The preregulator of claim 1 wherein
   said control means sets the value of said unipolar output voltage either to a first load voltage value, Vo1, or a second load voltage value, Vo2, said first load voltage value being less than said second load voltage value,
   said control means sets said unipolar output voltage output voltage equal to said second load voltage value, Vo2, if the peak value of said unipolar input voltage is above a second input voltage value Vi2, Vi2 being less than Vo1,
   said control means sets said unipolar output voltage equal to said first load voltage, Vo1, if the peak value of said unipolar input voltage is below a first input voltage value, Vi1, Vi1 being less than both Vi2 and Vo1, and
   said control means maintains said unipolar output voltage at said first load voltage value, Vo1, if the peak value of said unipolar input voltage increases above said first input voltage value, Vi1, but does not exceed said second input voltage value, Vi2, and maintains said unipolar output voltage at said second load voltage value, Vo2, if the peak value of said unipolar input voltage decreases below said second input voltage value, Vi2, but does not become less than said first input voltage value, Vi1.

6. The preregulator of claim 1 wherein said control means sets said unipolar output voltage, Vo, in accordance with the following predefined relationship: (a) Vo=Vo1 if the peak value of said unipolar input voltage, Vin, is less than Vin1; (b) Vo =Vo2 if the peak value of said unipolar input voltage, Vin, is greater than Vin2 and less than or equal to Vo2; (c) For peak values of said unipolar input voltage, Vin, between Vin1 and Vin2, Vo varies linearly between the values Vo1 and Vo2; where Vin is the peak value of said unipolar input voltage; Vo2 is greater than both Vo1 and Vin2; Vo1 is greater than Vin1; and Vin2 is greater than Vin1.

7. The preregulator of claim 6 wherein the operating load voltage range is between Vlmin and Vlmax, Vlmin and Vlmax being, respectively, the minimum and maximum values of the operating voltage range of said load, Vo1 being greater than Vlmin, and Vo2 being less than Vlmax.

8. The preregulator of claim 6 wherein Vo1 is essentially 300 Volts, Vo2 is essentially 390 Volts, Vin1 is essentially 270V and Vin2 is essentially 380V.

9. The preregulator of claim 1 wherein said control means includes an adaptive reference source, said adaptive reference source accepting an input signal indicative of the peak value of said unipolar input voltage, said adaptive reference source delivering a reference signal, Vra, indicative of the value at which said control means is to maintain the average value of said unipolar output voltage, said adaptive reference source varying the magnitude of the reference signal, Vra, as a means of adjusting the average value of said unipolar output voltage over said predefined range.

10. A boost switching preregulator comprising
    boost switching power conversion means for converting power from a source of unipolar input voltage for delivery as a unipolar output voltage to a load, and
    control means which accepts an input indicative of the magnitude of said unipolar output voltage and which, in response to variations in the magnitude of said unipolar input voltage, controls said boost switching power conversion means such that the magnitude of said unipolar output voltage varies within a range such that (a) said unipolar output voltage is greater than or equal to the magnitude of said unipolar input voltage, and (b) the span of said range is at least ten percent of the maximum value of said unipolar output voltage;

wherein said control means is arranged to set the value of said unipolar output voltage either to a first load voltage value, Vo1, or a second load voltage value, Vo2, said first load voltage value being less than said second load voltage value, wherein said control means sets said unipolar output voltage equal to said second load voltage value, Vo2, if said unipolar input voltage is above a second input voltage value Vi2, Vi2 being less than Vo1, wherein said control means sets said unipolar output voltage equal to said first load voltage, Vo1, if said unipolar input voltage is below a first input voltage vale, Vi1, Vi1 being less than both Vi2 and Vo1, and wherein said control means maintains said unipolar output voltage at said first load voltage value, Vo1, if said unipolar input voltage increases above said first input voltage value, Vi1, but does not exceed said second input voltage value, Vi2, and maintains said unipolar output voltage at said second load voltage value, Vo2, if said input voltage decreases below said second input voltage value, Vi2, but does not become less than said first input voltage value, Vi1.

11. The preregulator of claim 10 or 5 wherein Vi1 is essentially 200 Volts, Vi2 is essentially 230 Volts, Vo1 is essentially 250 Volts, and Vo2 is essentially 385 Volts.

12. A boost switching preregulator comprising
boost switching power conversion means for converting power from a source of unipolar input voltage for delivery as a unipolar output voltage to a load, and
control means which accepts an input indicative of the magnitude of said unipolar output voltage and which, in response to variations in the magnitude of said unipolar input voltage, controls said boosts witching power conversion means such that the magnitude of said unipolar output voltage varies within a range such that (a) said unipolar output voltage is greater than or equal to the magnitude of said unipolar input voltage, and (b) the span of said range is at least ten percent of the maximum value of said unipolar output voltage;
wherein said control means includes an adaptive reference source, said adaptive reference source accepting an input signal indicative of the magnitude of said unipolar input voltage, said adaptive reference source delivering a reference signal, Vra, indicative of the value at which said control means is to maintain said unipolar output voltage, said adaptive reference source varying the magnitude of the reference signal, Vra, as a means of adjusting the value of said unipolar output voltage over said range.

13. A controller for use in a boost switching preregulator of the kind having a boost switching power converter which converts power from a source of unipolar input voltage for delivery as a unipolar output voltage to a load, said controller comprising
input means for receiving an input signal indicative of the magnitude of said unipolar input voltage,
output means of outputting a control signal to said boost switching power converter to control said unipolar output voltage, and
control means for varying said control signal in response to said input signal to cause said unipolar output voltage to be greater than or equal to the magnitude of said unipolar input voltage, and to cause said unipolar output voltage to vary within a range spanning at least ten percent of the maximum value of said unipolar output voltage;

wherein said unipolar input voltage is a time-varying unipolar voltage derived from an AC source and having a peak value Vp, and said controller includes means for varying the value of said unipolar output voltage voltage Vo within said range such that Vo is greater than or equal to Vp.

14. The controller of claim 13 wherein
said unipolar input voltage is an essentially DC voltage at level Vin, and
said unipolar output voltage is an essentially DC voltage at level Vo.

15. The controller of claim 13 wherein said range falls within a predetermined spread of operating load voltages associated with said load.

16. The controller of claim 13 further comprising means for causing said unipolar output voltage to increase (decrease) as said unipolar input voltage increases (decreases).

17. The controller of claim 13 further comprising means for varying said unipolar output voltage between two values.

18. The controller of claim 13 further comprising setting means for setting the value of said unipolar output voltage either to a first load voltage value, Vo1, or a second load voltage value, Vo2, said first load voltage value being less than said second load voltage value, and wherein
said setting means
sets said unipolar output voltage equal to said second load voltage value, Vo2, if the peak value of said unipolar input voltage is above a second input voltage value Vi2, Vi2 being less than Vo1,
sets said unipolar output voltage equal to said first load voltage, Vo1, if the peak value of said unipolar input voltage is below a first input voltage value, Vi1, Vi1 being less than both Vi2 and Vo1,
maintains said unipolar output voltage at said first load voltage value, Vo1, if the peak value of said unipolar input voltage increases above said first input voltage value, Vi1, but does not exceed said second input voltage value, Vi2, and
maintains said unipolar output voltage at said second load voltage value, Vo2, if the peak value of said unipolar input voltage decreases below said second input voltage value, Vi2, but does not become less than said first input voltage value, Vi1.

19. The controller of claim 13 further comprising setting means for setting said unipolar output voltage, Vo, in accordance with the following predefined relationship: (a) Vo =Vo1 if said unipolar input voltage, Vin, is less than Vin1; (b) Vo=Vo2 if Vin i than Vin2 and less than or equal to Vo2; (c) for values of Vin between Vin1 and Vin2, Vo varies linearly between the values Vo1 and Vo2; where Vin is the value of said unipolar input voltage; Vo2 is greater than both Vo1 and Vin2; Vo1 is greater than Vin1; and Vin2 is greater than Vin1.

20. The controller of claim 13 further comprising setting means for said unipolar output voltage, Vo, in accordance with the following predefined relationship: (a) Vo=Vo1 if the peak value of said unipolar input voltage, Vin, is less than Vin1; (b) Vo=Vo2 if the peak value of said unipolar input voltage, Vin, is greater than Vin2 and less than or equal to Vo2; (c) for peak values of said unipolar input voltage, Vin, Vin1 and Vin2, Vo varies linearly between the values Vo1 and Vo2; where Vin is the peak value of said unipolar input voltage; Vo2 is greater than both Vo1 and Vin2; Vo1 is greater than Vin1; and Vin2 is greater than Vin1.

21. The controller of claim 19 or 20 wherein Vo1 is essentially 300 Volts, Vo2 is essentially 390 Volts, Vin1 is essentially 270V and Vin2 is essential 380V.

22. The controller of claim 13 further comprising an adaptive reference source, said adaptive reference source accepting an input signal indicative of the peak value of said unipolar input voltage, said adaptive reference source delivering a reference signal, Vra, indicative of the value at which said controller is to maintain said average unipolar output voltage, said adaptive reference source varying the magnitude of the reference signal, Vra, as a means of adjusting the average value of said unipolar output voltage over said range.

23. A controller for use in a boost switching preregulator of the kind having a boost switching power converter which converts power from a source of unipolar input voltage for delivery as a unipolar output voltage to a load, said controller comprising
   input means for receiving an input signal indicative of the magnitude of said unipolar input voltage,
   output means for outputting a control signal to said boost switching power converter to control said unipolar output voltage, and
   control means for varying said control signal in response to said input signal to cause said unipolar output voltage to be greater than or equal to the magnitude of said unipolar input voltage, and to cause said unipolar output voltage to vary within a range spanning at least ten percent of the maximum value of said unipolar output voltage;
   further comprising setting means for setting the value of said unipolar output voltage either to a first load voltage value, Vo1, or a second load voltage value, Vo2, said first load voltage value being less than said second load voltage value, and wherein
   said setting means sets said unipolar output voltage equal to said second load voltage value, Vo2, if said unipolar input voltage is above a second input voltage value, Vi2, Vi2 being less than Vo1,
   said setting mans ses said unipolar output voltage equal to said first load voltage, Vo1, if said unipolar input voltage is below a first input voltage value, Vi1, Vi1 being less than both Vi2 and Vo1, and
   said setting means maintains said unipolar output voltage at said first load voltage value, Vo1, if said unipolar input voltage increases above said first input voltage value, Vi1, but does not exceed said second input voltage value, Vi2, and maintains said unipolar output voltage at said second load voltage value, Vo2, if said input voltage decreases below said second input voltage value, Vi2, but does not become less than said first input voltage value, Vi1.

24. The controller of claim 23 or 18 wherein Vi1 is essentially 200 Volts, Vi2 is essentially 230 volts, Vo1 is essentially 250 Volts, and Vo2 is essentially 385 Volts.

25. The controller of claim 23, 18, 19, or 20 wherein the operating load voltage range is between Vlmin and Vlmax, Vlmin and Vlmax being, respectively, the minimum and maximum values of the operating voltage range of said load, Vo1 being greater than Vlmin, and Vo2 being less than Vlmax.

26. A controller for use in a boost switching preregulator of the kind having a boost switching power converter which converts power from a source of unipolar input voltage for delivery as a unipolar output voltage to a load, said controller comprising
   input means for receiving an input signal indicative of the magnitude of said unipolar input voltage,
   output means for outputting a control signal to said boost switching power converter to control said unipolar output voltage, and
   control means for varying said control signal in response to said input signal to cause said unipolar output voltage to be greater than or equal to the magnitude of said unipolar input voltage, and to cause said unipolar output voltage to vary within a range spanning at least ten percent of the maximum value of said unipolar output voltage;
   further comprising an adaptive reference source, said adaptive reference source accepting an input signal indicative of the magnitude of said unipolar input voltage, said adaptive reference source delivering a reference signal, Vra, indicative of the value at which said controller is to maintain said unipolar output voltage, said adaptive reference source varying the magnitude of the reference signal, Vra, as a means of adjusting the value of said unipolar output voltage over said range.

27. A method of controlling a boost switching preregulator of the kind which converts power from a source of unipolar input voltage for delivery as a unipolar output voltage to a load, said method comprising the steps of
   varying the value of said unipolar output voltage in response to variations in the magnitude of said unipolar input voltage within a range such that said unipolar output voltage is greater than or equal to the magnitude of said unipolar input voltage, and
   varying the value of said unipolar output voltage in response to variations in the magnitude of said unipolar input voltage within a range that spans at least ten percent of the maximum value of said unipolar output voltage;
   wherein said unipolar input voltage is a time-varying unipolar voltage derived from an AC source and having a peak value Vp, and the value of said unipolar output voltage Vo is varied within a range such that Vo is greater than or equal to Vp.

28. The method of claim 21 wherein
   said unipolar input voltage is an essentially DC voltage at level Vin, and
   said unipolar output voltage is an essentially DC voltage at level Vo.

29. The method of claim 27 wherein said range falls within a predetermined spread of operating load voltages associated with said load.

* * * * *

UNITED STATES PATENT AND TRADEMARK OFFICE
CERTIFICATE OF CORRECTION

PATENT NO. : 5,289,361

DATED : February 22, 1994

INVENTOR(S) : Patrizio VINCIARELLI

It is certified that error appears in the above-identified patent and that said Letters Patent is hereby corrected as shown below:

Column 2, line 40, delete "ViI" and insert --Vi1--;

Column 2, line 45, delete "VoI" and insert --Vo2--;

Column 2, line 46, delete "Vinl" and insert --Vin1--;

Column 2, line 52, delete "Vol" and insert --Vo1--;

Column 2, line 53, delete "Vinl" and insert --Vin1--.

Column 3, line 27, delete "VoI" and insert --Vo1--;

Column 3, line 34, delete "ViI, Vil" and insert --Vi1, Vi1--;

Column 3, line 35, delete "VoI" and insert --Vo1--;

Column 3, line 36, delete "Vol" and insert --Vo1--;

Column 3, line 38, delete "Vil" and insert --Vi1--;

Column 3, line 3 - line 40, delete text beginning with "by varying" and ending with "Vo2, if the" and insert same into column 2, line 38 after "load,"

Column 6, line 12, insert --)-- after "350.

Column 7, line 7, delete "100" and insert --200--;

Column 7, line 27, delete "=D.Iin" and insert --=D·Iin--;

UNITED STATES PATENT AND TRADEMARK OFFICE
CERTIFICATE OF CORRECTION

PATENT NO. : 5,289,361

DATED : February 22, 1994

INVENTOR(S) : Patrizio VINCIARELLI

It is certified that error appears in the above-identified patent and that said Letters Patent is hereby corrected as shown below:

Column 8, line 40 - line 41, delete "(-2.Ip)" and insert --(2·Ip)--.

Column 9, line 36, delete "Vol" and insert --Vo1--;

Column 9, line 40, delete "Vpl" and insert --Vp1--;

Column 9, line 41, delete "Vol" and insert --Vo1--;

Column 9, line 42, delete "Vpl" and insert --Vp1--;

Column 9, line 45, delete "Vpl" and insert --Vp1--;

Column 9, line 48, delete "Vol" and insert --Vo1--;

Column 9, line 53, delete "Vpl" and insert --Vp1-- and delete "Vol" and insert --Vo1--.

Column 10, line 5, delete "55D" and insert --550--;

Column 10, line 42, delete "$0" and insert --50--.

Column 11, line 6, delete "$0" and insert --50--;

Column 11, line 14, delete "$$0" and insert --550--;

Column 11, line 17, insert --,-- after "way";

Column 11, line 29, delete "450" and insert --480--;

Column 11, line 40, delete "KI.Vp" and insert --KI·Vp--;

UNITED STATES PATENT AND TRADEMARK OFFICE
CERTIFICATE OF CORRECTION

PATENT NO.  : 5,289,361

DATED       : February 22, 1994

INVENTOR(S) : Patrizio VINCIARELLI

It is certified that error appears in the above-identified patent and that said Letters Patent is hereby corrected as shown below:

Column 11, line 52, Equation 10 is duplicated, delete first occurance of Equation 10.

Column 11, line 57, delete "VI" and insert --V1--;

Column 11, line 58, delete "VI" and insert --V1--;

Column 11, line 62, delete "Vpl" in Equation 11 and insert --Vp1--;

Column 12, line 9, insert --and-- before "Vrah" in Equation 14;

Column 12, line 14, delete "Vol" and insert --Vo1--;

Column 12, line 17, delete "Vol" in Equation 15 and insert --Vo1--;

Column 12, line 20, delete "Vol" and insert --Vo1-- and delete "Vpl" and insert --Vp1--;

Column 12, line 24, delete "Vol" and insert --Vo1-- and delete "Vpl" and insert --Vp1--;

Column 12, line 31, delete "555" and insert --585--;

Column 12, line 33, delete "$9$" and insert --595--;

Column 12, line 41, delete "6?c" and insert --600--;

Column 12, line 53, delete "$54" and insert --554--;

UNITED STATES PATENT AND TRADEMARK OFFICE
CERTIFICATE OF CORRECTION

PATENT NO.   : 5,389,361

DATED        : February 22, 1994

INVENTOR(S)  : Patrizio VINCIARELLI

It is certified that error appears in the above-identified patent and that said Letters Patent is hereby corrected as shown below:

Column 12, line 55, delete "12" and insert --I2--;

Column 12, line 60, delete "K1 Vp > Vr" in Equation 17 and insert --K1·Vp>Vr--;

Column 12, line 64, delete "K1.Vp" and insert --K1·Vp--.

Column 13, line 49, delete "wi)1" and insert --will--.

Column 14, line 65, delete "70" and insert --7$\tilde{0}$2--.

Column 15, line 19, delete "705" and insert --708--;

Column 15, line 22, delete "702" and insert --700--;

Column 18, line 25, delete "VinI" and insert --Vin1--;

Column 18, line 28, delete "VinI" and insert --Vin1--;

UNITED STATES PATENT AND TRADEMARK OFFICE
CERTIFICATE OF CORRECTION

PATENT NO. : 5,289,361

DATED : February 22, 1994

INVENTOR(S) : Patrizio VINCIARELLI

It is certified that error appears in the above-identified patent and that said Letters Patent is hereby corrected as shown below:

Column 18, line 29, delete "Vol" and insert --Vo1--;

Column 18, line 31, delete "Vol" and insert --Vo1--;

Column 18, line 40, delete "Vinl" and insert --Vin1--.

Column 19, line 14, delete "vale" and insert --value--;

Column 19, line 39, delete "witching" and insert --switching--;

Col. 20, lines 39 and 43, delete "Vol" and insert --Vo1--;

Column 20, line 56, delete "i" and insert --is greater--;

Column 20, line 60, delete "Vol" and insert --Vo1--;

Column 20, line 61, delete "Vol" and insert --Vo1--;

Column 20, line 66, delete "Vol" and insert --Vo1--.

Column 21, line 5, delete "Vol" and insert --Vo1--;

Column 21, line 47, delete "mans ses" and insert --means sets--.

UNITED STATES PATENT AND TRADEMARK OFFICE
CERTIFICATE OF CORRECTION

PATENT NO. : 5,289,361

DATED : February 22, 1994

INVENTOR(S) : Patrizio VINCIARELLI

It is certified that error appears in the above-identified patent and that said Letters Patent is hereby corrected as shown below:

Column 22, line 54, delete "21" and insert --27--.

Signed and Sealed this

Eighth Day of November, 1994

Attest:

BRUCE LEHMAN

Attesting Officer

Commissioner of Patents and Trademarks